(12) United States Patent
Rahmes et al.

(10) Patent No.: US 9,417,357 B2
(45) Date of Patent: *Aug. 16, 2016

(54) METHOD FOR HYDROCARBON RECOVERY WITH CHANGE DETECTION AND RELATED APPARATUS

(71) Applicant: HARRIS CORPORATION, Melbourne, FL (US)

(72) Inventors: Mark Rahmes, Melbourne, FL (US); Mark Blue, Palm Bay, FL (US); Mark Trautman, Melbourne, FL (US); Keith Nugent, Palm Bay, FL (US)

(73) Assignee: HARRIS CORPORATION, Melbourne, FL (US)

( * ) Notice: Subject to any disclaimer, the term of this patent is extended or adjusted under 35 U.S.C. 154(b) by 425 days.

This patent is subject to a terminal disclaimer.

(21) Appl. No.: 14/037,464

(22) Filed: Sep. 26, 2013

(65) Prior Publication Data

US 2015/0088427 A1     Mar. 26, 2015

(51) Int. Cl.
   *G01V 9/00*    (2006.01)
   *E21B 43/24*   (2006.01)
   *G01V 99/00*   (2009.01)

(52) U.S. Cl.
   CPC ............ *G01V 9/005* (2013.01); *E21B 43/2405* (2013.01); *G01V 99/00* (2013.01)

(58) Field of Classification Search
   CPC .................................................... G01V 9/005
   USPC ......................................................... 702/11
   See application file for complete search history.

(56) References Cited

U.S. PATENT DOCUMENTS

| | | | |
|---|---|---|---|
| 3,894,769 | A | 7/1975 | Tham et al. |
| 3,896,668 | A | 7/1975 | Anderson et al. |
| 4,941,193 | A | 7/1990 | Barnsley et al. |
| 5,063,509 | A | 11/1991 | Coles et al. |
| 5,065,447 | A | 11/1991 | Barnsley et al. |
| 5,086,643 | A | 2/1992 | Marek |
| 5,331,155 | A | 7/1994 | Blauch |
| 5,384,867 | A | 1/1995 | Barnsley et al. |
| 5,416,856 | A | 5/1995 | Jacobs et al. |
| 5,430,812 | A | 7/1995 | Barnsley et al. |
| 6,466,687 | B1 | 10/2002 | Uppaluri et al. |
| 7,051,811 | B2 | 5/2006 | de Rouffignac et al. |
| 7,066,254 | B2 | 6/2006 | Vinegar et al. |
| 7,096,942 | B1 | 8/2006 | de Rouffignac et al. |
| 7,156,176 | B2 | 1/2007 | Vinegar et al. |
| 7,225,866 | B2 | 6/2007 | Berchenko et al. |

(Continued)

OTHER PUBLICATIONS

Shannon, "A Mathematical Theory of Communication," The Bell System Technical Journal, vol. 27, Jul., Oct. 1948, pp. 1-55.

(Continued)

*Primary Examiner* — Bryan Bui
(74) *Attorney, Agent, or Firm* — Allen, Dyer, Doppelt, Milbrath & Gilchrist, P.A.

(57) ABSTRACT

A method for predicting hydrocarbon recovery in a subterranean formation may include generating pre-heating data associated with fracturing in a sample from the subterranean formation, heating the sample with RF power to cause additional fracturing in the sample, and generating post-heating data associated with additional fracturing in the sample after heating with RF power. The method may also include detecting change between the pre-heating data and post-heating data, and predicting hydrocarbon recovery from the subterranean formation based upon the detected change.

25 Claims, 17 Drawing Sheets

(56) References Cited

U.S. PATENT DOCUMENTS

| | | | |
|---|---|---|---|
| 7,441,597 | B2 | 10/2008 | Kasevich |
| 7,526,413 | B2 | 4/2009 | Dahlberg |
| 7,660,451 | B2 | 2/2010 | Reeves et al. |
| 7,735,935 | B2 | 6/2010 | Vinegar et al. |
| 7,789,164 | B2 | 9/2010 | Looney et al. |
| 7,885,438 | B2 | 2/2011 | Uppaluri et al. |
| 7,891,421 | B2 | 2/2011 | Kasevich |
| 7,980,304 | B2 | 7/2011 | O'Brien |
| 8,085,974 | B2 | 12/2011 | Dvorkin et al. |
| 8,311,788 | B2 | 11/2012 | Hurley et al. |
| 8,463,006 | B2 | 6/2013 | Prokoski |
| 2008/0205717 | A1 | 8/2008 | Reeves et al. |
| 2010/0078163 | A1 | 4/2010 | Banerjee et al. |
| 2010/0294488 | A1 | 11/2010 | Wheeler et al. |
| 2010/0294489 | A1 | 11/2010 | Dreher, Jr. et al. |
| 2013/0098610 | A1* | 4/2013 | Trautman ............ E21B 43/2401 166/272.3 |
| 2014/0014494 | A1* | 1/2014 | Blue ................. B01J 19/129 204/157.6 |
| 2015/0088479 | A1* | 3/2015 | Rahmes .................. E21B 41/00 703/10 |

OTHER PUBLICATIONS

Viola, "Alignment by Maximization of Mutual Information," Technical Report 1548, 1995, pp. 1-156.

Babadagli et al., "Fractal Characteristics of Rocks Fractured Under Tension," Theoretical and Applied Fracture Mechanics 39, 2003, pp. 73-88.

Russakoff et al., "Image Similarity Using Mutual Information of Regions," ECCV 2004, pp. 596-607.

Peng et al., "Feature Selection Based on Mutual Information: Criteria of Max-Dependency, Max-Relevance, and Min-Redundancy," IEEE Transactions on Pattern Analysis and Machine Intelligence, vol. 27, No. 8, Aug. 2005, pp. 1226-1238.

Sundaresan et al., "Robustness of Change Detection Algorithms in the Presence of Registration Errors," Photogrammetric Engineering & Remote Sensing, vol. 73, No. 4, Apr. 2007, pp. 373-383.

Gavish, "A Crash Course on Shannon's Mutual Information for Categorical Data Analysis," Jan. 7, 2011, pp. 1-55.

Odunuga, "Investigating Drainage Patterns of Shale Production as a Function of Type of Fracture System in the Reservoir," University of Oklahoma Graduate College, 2012, pp. 1-100.

Rijken, "Modeling Naturally Fractured Reservoirs: From Experimental Rock Mechanics to Flow Simulation," University of Texas at Austin, May 2005, 275 pages.

Bello, "Rate Transient Analysis in Shale Gas Reservoirs with Transient Liner Behavior," Graduate Studies of Texas A&M University, May 2009, 190 pages.

* cited by examiner

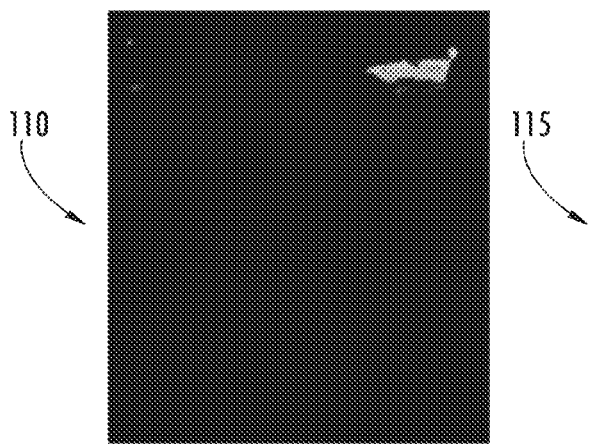
FIG. 10A  FIG. 10B
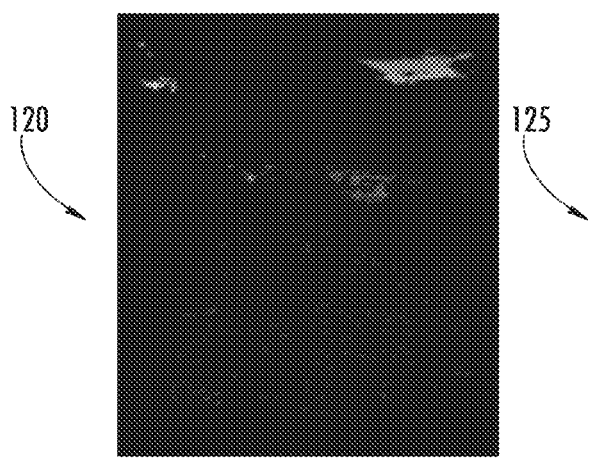
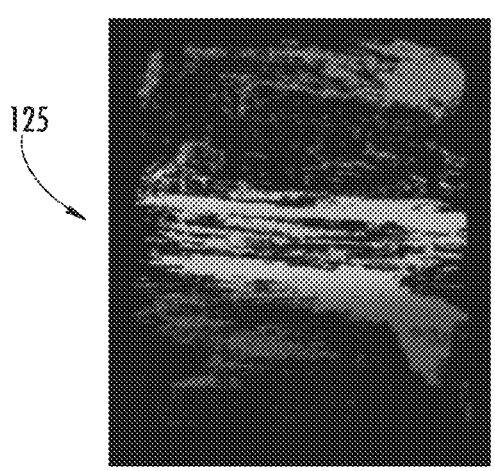
FIG. 11A  FIG. 11B
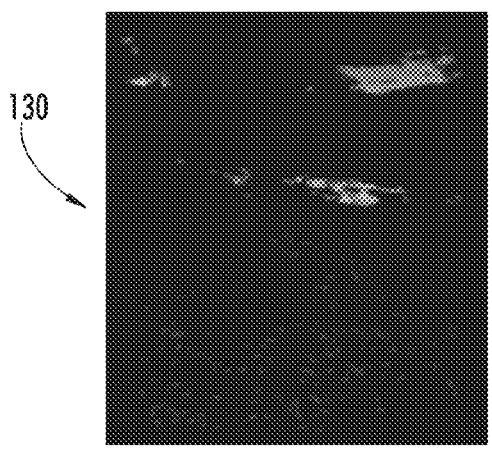
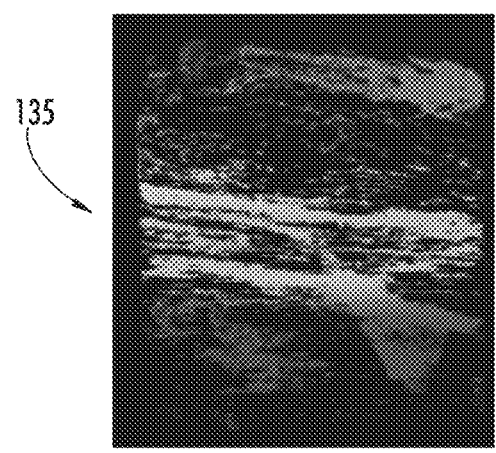
FIG. 12A  FIG. 12B

METHOD FOR HYDROCARBON RECOVERY WITH CHANGE DETECTION AND RELATED APPARATUS

FIELD OF THE INVENTION

The present invention relates to the field of hydrocarbon resource processing, and, more particularly, to a method for recovering hydrocarbons and related apparatuses.

BACKGROUND OF THE INVENTION

Energy consumption worldwide is generally increasing, and conventional hydrocarbon resources are being consumed. In an attempt to meet demand, the exploitation of unconventional resources may be desired. For example, highly viscous hydrocarbon resources, such as heavy oils, may be trapped in sands where their viscous nature does not permit conventional oil well production. This category of hydrocarbon resource is generally referred to as oil sands. Estimates are that trillions of barrels of oil reserves may be found in such oil sand formations.

In some instances, these oil sand deposits are currently extracted via open-pit mining. Another approach for in situ extraction for deeper deposits is known as Steam-Assisted Gravity Drainage (SAGD). The heavy oil is immobile at reservoir temperatures, and therefore, the oil is typically heated to reduce its viscosity and mobilize the oil flow. In SAGD, pairs of injector and producer wells are formed to be laterally extending in the ground. Each pair of injector/producer wells includes a lower producer well and an upper injector well. The injector/production wells are typically located in the payzone of the subterranean formation between an underburden layer and an overburden layer.

The upper injector well is used to typically inject steam, and the lower producer well collects the heated crude oil or bitumen that flows out of the formation, along with any water from the condensation of injected steam. The injected steam forms a steam chamber that expands vertically and horizontally in the formation. The heat from the steam reduces the viscosity of the heavy crude oil or bitumen, which allows it to flow down into the lower producer well where it is collected and recovered. The steam and gases rise due to their lower density. Gases, such as methane, carbon dioxide, and hydrogen sulfide, for example, may tend to rise in the steam chamber and fill the void space left by the oil defining an insulating layer above the steam. Oil and water flow is by gravity driven drainage urged into the lower producer well.

Operating the injection and production wells at approximately reservoir pressure may address the instability problems that adversely affect high-pressure steam processes. SAGD may produce a smooth, even production that can be as high as 70% to 80% of the original oil in place (OOIP) in suitable reservoirs. The SAGD process may be relatively sensitive to shale streaks and other vertical barriers since, as the rock is heated, differential thermal expansion causes fractures in it, allowing steam and fluids to flow through. SAGD may be twice as efficient as the older cyclic steam stimulation (CSS) process.

Many countries in the world have large deposits of oil sands, including the United States, Russia, and various countries in the Middle East. Oil sands may represent as much as two-thirds of the world's total petroleum resource, with at least 1.7 trillion barrels in the Canadian Athabasca Oil Sands, for example. At the present time, only Canada has a large-scale commercial oil sands industry, though a small amount of oil from oil sands is also produced in Venezuela. Because of increasing oil sands production, Canada has become the largest single supplier of oil and products to the United States. Oil sands now are the source of almost half of Canada's oil production, while Venezuelan production has been declining in recent years. Oil is not yet produced from oil sands on a significant level in other countries.

U.S. Published Patent Application No. 2010/0078163 to Banerjee et al. discloses a hydrocarbon recovery process whereby three wells are provided: an uppermost well used to inject water, a middle well used to introduce microwaves into the reservoir, and a lowermost well for production. A microwave generator generates microwaves which are directed into a zone above the middle well through a series of waveguides. The frequency of the microwaves is at a frequency substantially equivalent to the resonant frequency of the water so that the water is heated.

Along these lines, U.S. Published Patent Application No. 2010/0294489 to Dreher, Jr. et al. discloses using microwaves to provide heating. An activator is injected below the surface and is heated by the microwaves, and the activator then heats the heavy oil in the production well. U.S. Published Patent Application No. 2010/0294488 to Wheeler et al. discloses a similar approach.

U.S. Pat. No. 7,441,597 to Kasevich discloses using a radio frequency generator to apply radio frequency (RF) energy to a horizontal portion of an RF well positioned above a horizontal portion of an oil/gas producing well. The viscosity of the oil is reduced as a result of the RF energy, which causes the oil to drain due to gravity. The oil is recovered through the oil/gas producing well.

U.S. Pat. No. 7,891,421, also to Kasevich, discloses a choke assembly coupled to an outer conductor of a coaxial cable in a horizontal portion of a well. The inner conductor of the coaxial cable is coupled to a contact ring. An insulator is between the choke assembly and the contact ring. The coaxial cable is coupled to an RF source to apply RF energy to the horizontal portion of the well.

Unfortunately, long production times, for example, due to a failed start-up, to extract oil using SAGD may lead to significant heat loss to the adjacent soil, excessive consumption of steam, and a high cost for recovery. Significant water resources are also typically used to recover oil using SAGD, which impacts the environment. Limited water resources may also limit oil recovery.

Hydrocarbon resources may also be removed from other subterranean formations, such as oil shale, for example. Oil shale (kerogen shale) is sedimentary rock containing hydrocarbons, i.e. shale oil. One typical approach to shale oil extraction is to heat the oil shale to vaporize the shale oil, which can be subsequently collected. Nevertheless, this approach can be quite costly, especially when compared to other hydrocarbon resource extraction methods. It is desirable to more efficiently recover these hydrocarbon resources.

SUMMARY OF THE INVENTION

In view of the foregoing background, it is therefore an object of the present invention to provide a method for hydrocarbon recovery that is efficient and robust.

This and other objects, features, and advantages in accordance with the present invention are provided by a method for predicting hydrocarbon recovery in a subterranean formation. The method may include generating pre-heating data associated with fracturing in a sample from the subterranean formation, heating the sample with RF power to cause additional fracturing in the sample, generating post-heating data associated with additional fracturing in the sample after heating with RF power, detecting change between the pre-heating data and post-heating data, and predicting hydrocarbon recovery from the subterranean formation based upon the detected change. Advantageously, the predicted hydrocarbon recovery is accurate and may reduce recovery costs.

More specifically, the detecting of change may comprise detecting a volumetric change in fracturing. The pre-heating data may comprise three-dimensional mapping pre-heating data, and the post-heating data may comprise three-dimensional mapping post-heating data. For example, the generating of the pre-heating data and the post-heating data may each comprise using computed tomography (CT) scanning to generate the data.

In some embodiments, the method may further comprise performing at least one filter process on each of the pre-heating data and post-heating data. The detecting of change may comprise performing mutual information calculations.

The generating of the pre-heating data may comprise performing at least one first edge detection process, and the generating of the post-heating data may comprise performing at least one second edge detection process. The generating of the pre-heating data may further comprise performing at least one first blob filter process after the at least one first edge detection process, and the generating of the post-heating data may further comprise performing at least one second blob filter process after the at least one second edge detection process.

The method may also further comprise displaying at least one image based upon the pre-heating data and the post-heating data. Additionally, the method may comprise applying RF power to the subterranean formation based upon the predicted hydrocarbon recovery, and recovering hydrocarbons from the subterranean formation after applying RF power thereto.

Another aspect is directed to an apparatus for predicting hydrocarbon recovery in a subterranean formation from a sample thereof. The apparatus may include an RF antenna, a sensor, and a processor coupled to the RF antenna and the sensor. The processor may be configured to generate pre-heating data associated with fracturing in the sample via the sensor, heat the sample with RF power from the RF antenna to cause additional fracturing in the sample, generate post-heating data, via the sensor, associated with additional fracturing in the sample after heating with RF power, detect change between the pre-heating data and post-heating data, and predict hydrocarbon recovery from the subterranean formation based upon the detected change.

BRIEF DESCRIPTION OF THE DRAWINGS

FIGS. 10A and 10B are images of a volume from the sample with Blob3D processing, pre-heating and post-heating, respectively, at a first threshold.
FIGS. 11A and 11B are images of a volume from the sample with Blob3D processing, pre-heating and post-heating, respectively, at a second threshold.
FIGS. 12A and 12B are images of a volume from the sample with Blob3D processing, pre-heating and post-heating, respectively, at a third threshold.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments. For example, although descriptions of the pre and post-RF fractures are all RF heating related, the present disclosure is envisioned to include any induced deformation (pressure fractures, thermally induced fractures, etc.).

Figure 1:
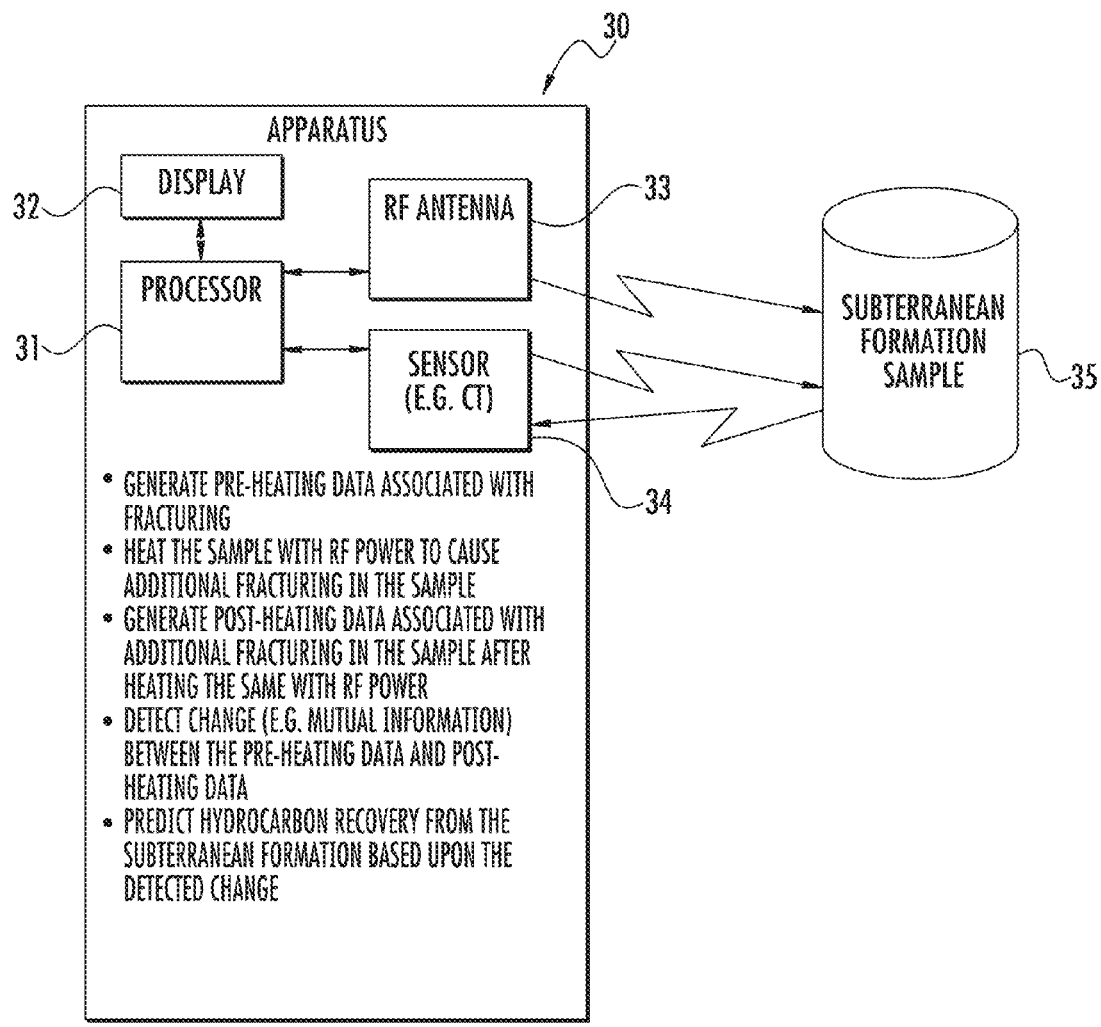
FIG. 1 is a schematic diagram of an apparatus, according to the present invention.

Referring initially to FIG. 1, an apparatus 30 according to the present invention is now described. The apparatus 30 is for predicting hydrocarbon recovery in a subterranean formation from a sample 35 thereof. As will be appreciated by those skilled in the art, the sample 35 may be in situ, i.e. still in the subterranean formation, or the sample may be collected and processed separately, as in the illustrated embodiment.

The apparatus 30 includes an RF antenna 33, a sensor 34, and a processor 31 coupled to the RF antenna and the sensor. The apparatus 30 also illustratively includes a display 32 coupled to the processor 31. In some embodiments, the sensor 34 may comprise a CT device comprising an X-ray source for directed radiation to the sample 35, and a radiation sensor for detecting reflected X-ray radiation from the sample. Of course, it other embodiments, the sensor 34 may utilize other forms of radiation and/or particles. The radiation sensor may be positioned opposite the X-ray source in some embodiments.

Figure 2:
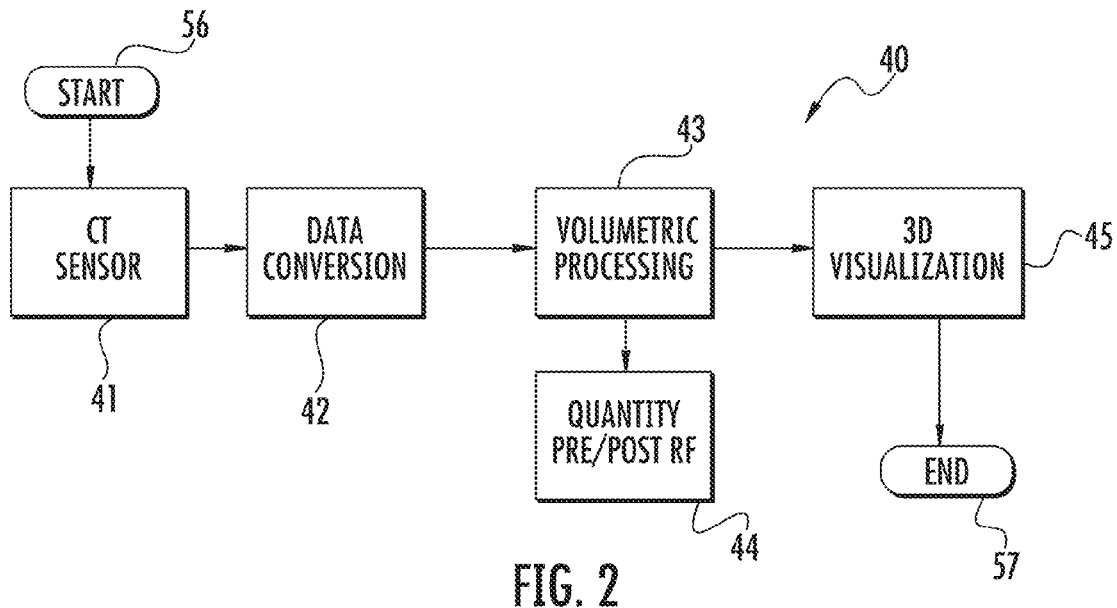
FIG. 2 is a flowchart illustrating operation of an embodiment of the apparatus of FIG. 1.
Figure 3:
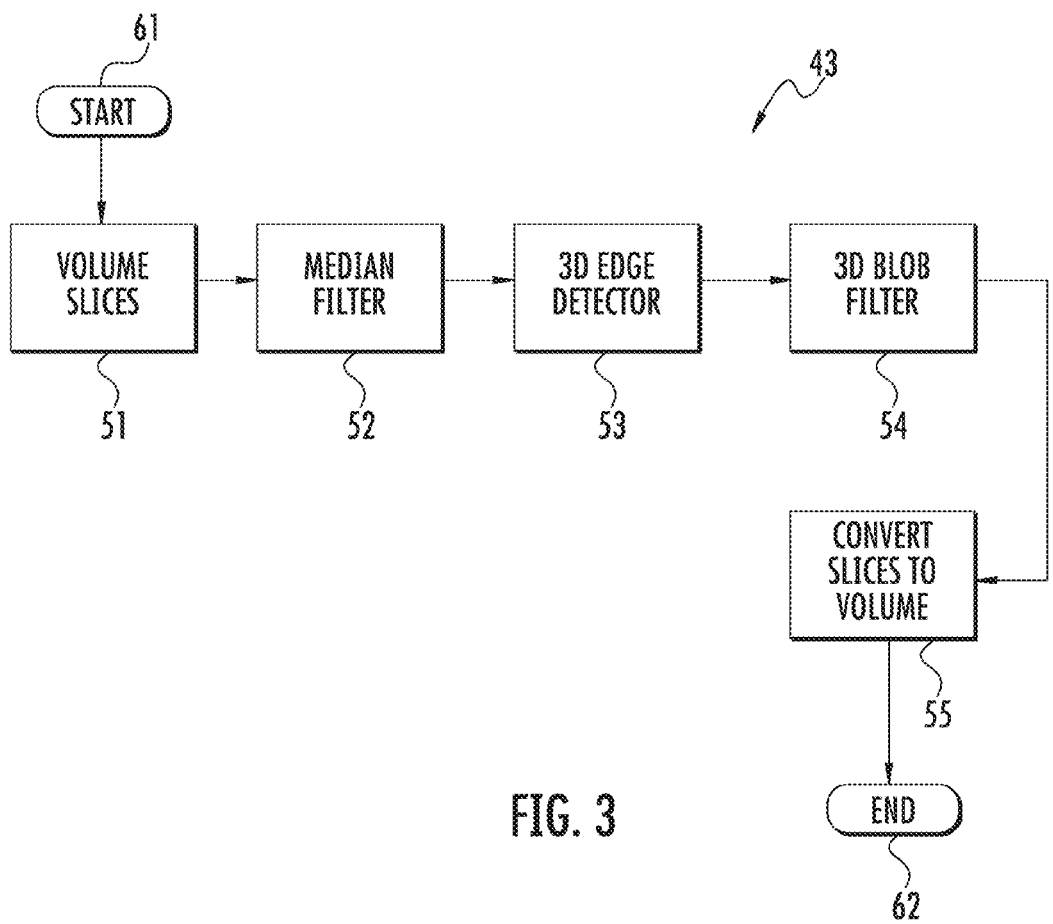
FIG. 3 is a detailed flowchart of the volumetric processing block of FIG. 2.
Figure 4:
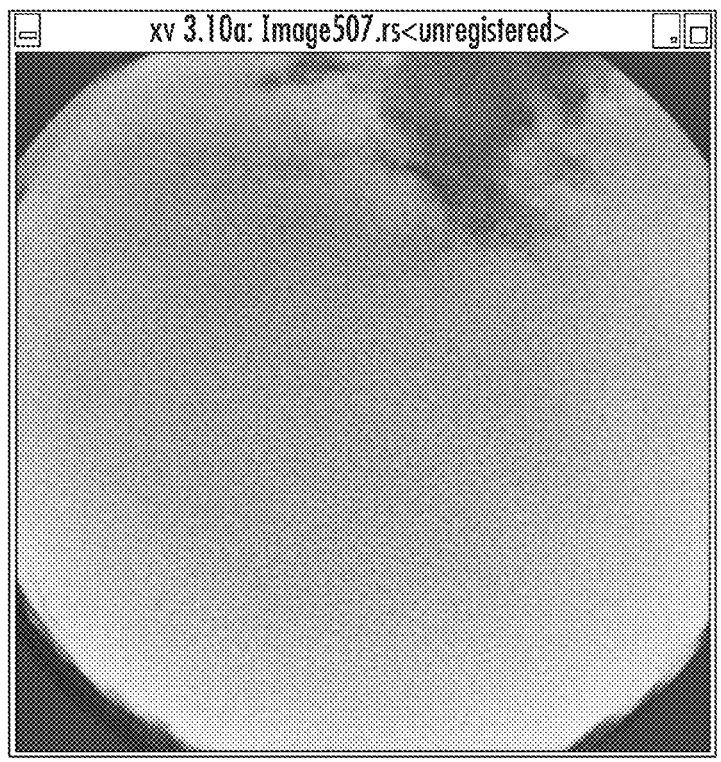
FIGS. 4-5 are images of a volume slice from a sample, pre-heating and post-heating, respectively.
Figure 5:
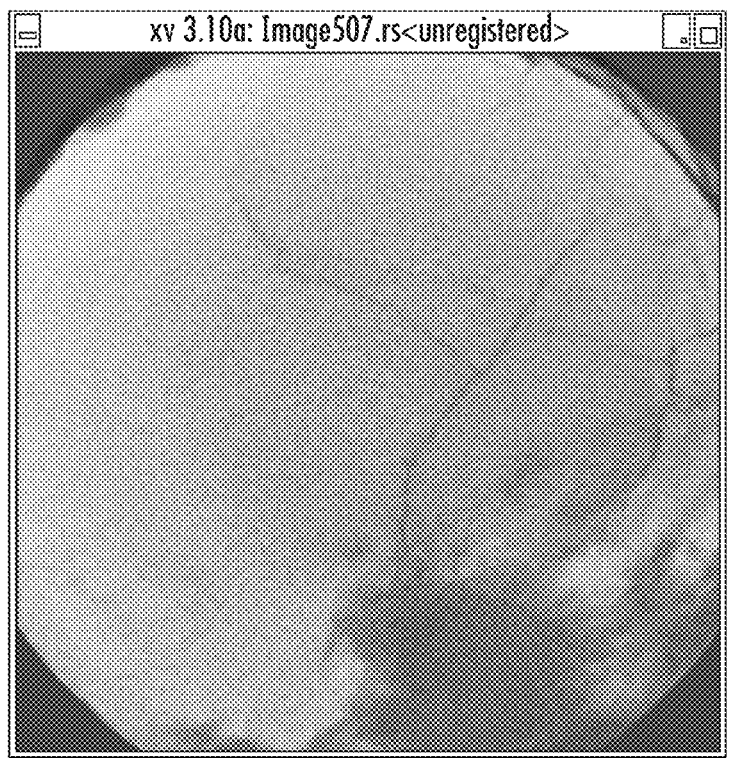
Figure 6A:
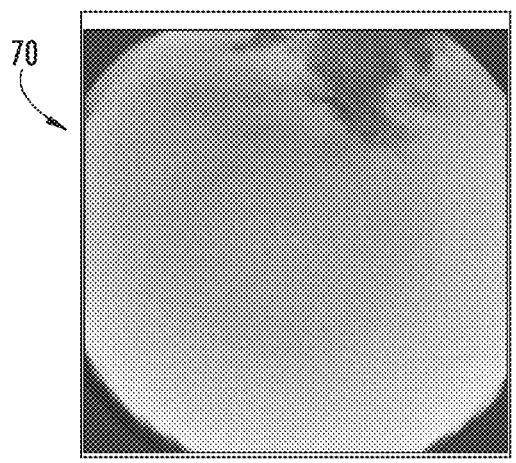
FIG. 6A is an image of the pre-heating volume slice from the sample.
Figure 6B:
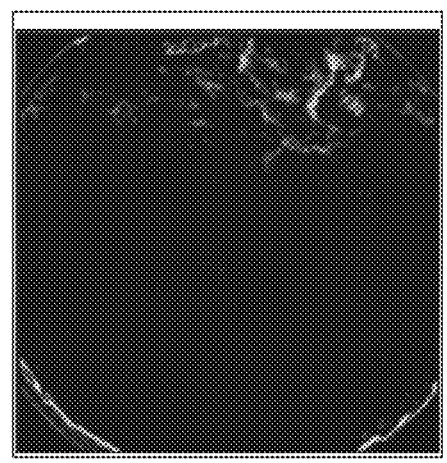
FIG. 6B is an image of the pre-heating volume slice from the sample with Edge3D processing.
Figure 7A:
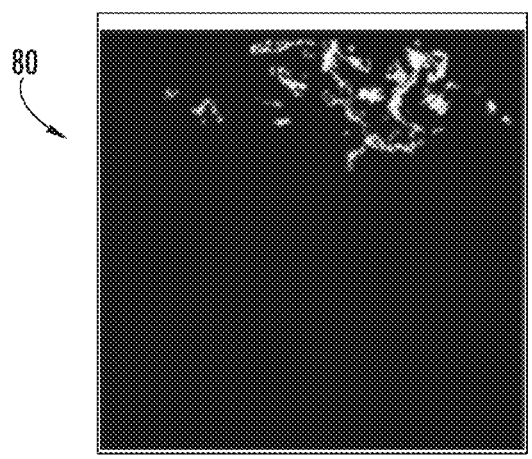
FIG. 7A is an image of the pre-heating volume slice from the sample with Blob3D processing.
Figure 7B:
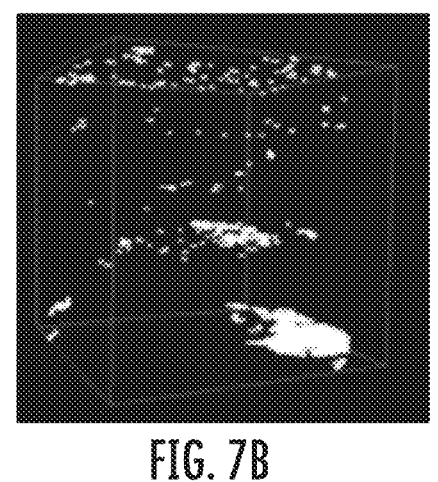
FIG. 7B is an image of the pre-heating volume from the sample.
Figure 8A:
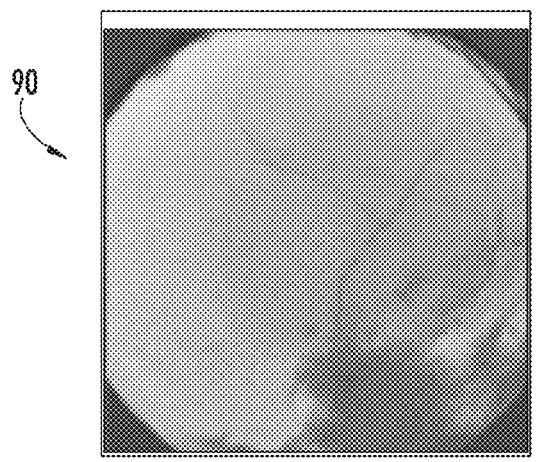
FIG. 8A is an image of the post-heating volume slice from the sample.
Figure 8B:
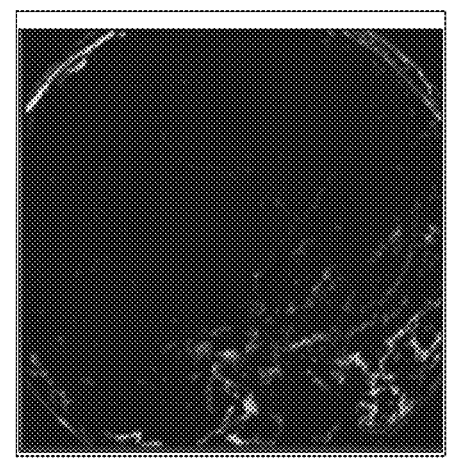
FIG. 8B is an image of the post-heating volume slice from the sample with Edge3D processing.
Figure 9A:
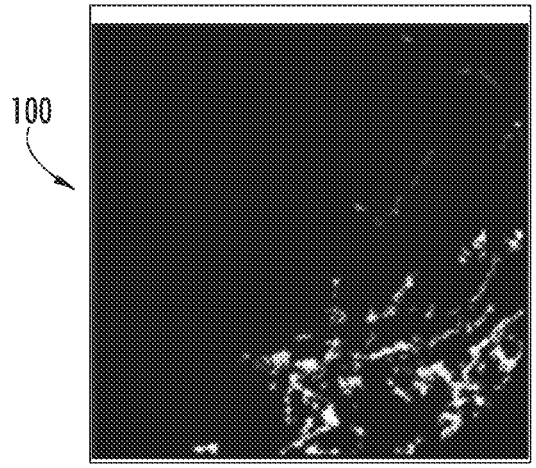
FIG. 9A is an image of the post-heating volume slice from the sample with Blob3D processing.
Figure 9B:
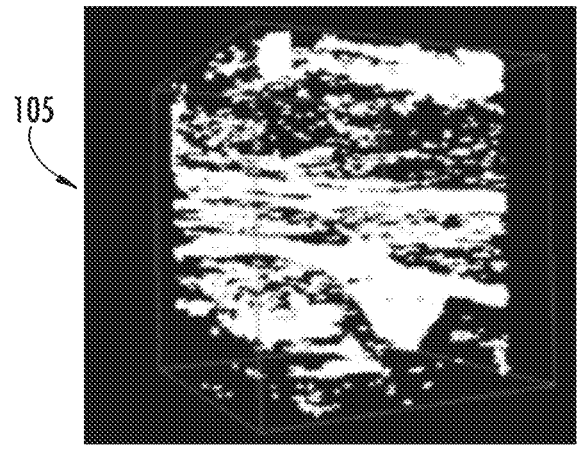
FIG. 9B is an image of the post-heating volume from the sample.

Referring now additionally to FIG. 2, a flowchart 40 describes a method of operation for the apparatus 30 (Block 56). The method is for predicting hydrocarbon recovery in a subterranean formation via an analysis of the sample 35. Initially, the sensor 34 is activated to scan the sample 35 (Block 41).

The method also includes a data conversion (Block 42) where the data ingested from the sensor 34 is converted to an image file format. For example, the sensor 34 may output data in a Digital Imaging and Communications in Medicine (DI-COM) format, and the conversion changes such data to a bitmap image file or a raster image file. The method includes a volumetric processing at Block 43.

The method includes generating pre-heating data associated with fracturing in a sample 35 from the subterranean formation. In other words, the sample 35 is examined for a baseline state via the sensor 34, so that subsequent states are readily comparable. The method also includes heating the sample 35 with RF power from the RF antenna 33 to cause additional fracturing in the sample. As will be appreciated, the RF heating causes the hydrocarbon resources (e.g. shale oil) in the sample 35 to expand and cause fractures therein.

Subsequent to the RF heating, the method includes generating post-heating data (via the sensor 34) associated with additional fracturing in the sample 35 after heating the sample with RF power. More specifically, the pre-heating data comprises three-dimensional mapping pre-heating data (e.g. point cloud data), and the post-heating data comprises three-dimensional mapping post-heating data.

Both the pre-heating data and post-heating data are processed though Blocks 41-43, and at Block 44, the method includes detecting change between the pre-heating data and post-heating data. The detecting of change may comprise performing mutual information calculations. In the illustrated embodiments, the detecting of change comprises detecting a volumetric change in fracturing.

The method further comprises displaying at least one image based upon the pre-heating data and the post-heating data (Blocks 45, 57). In some embodiments, the method includes displaying only changes between the pre-heating data and the post-heating data. The displaying of the change data may be slice based or as a volume (i.e. multiple slices).

The method also includes predicting hydrocarbon recovery from the subterranean formation based upon the detected change. In short, by leveraging change detection processes, the apparatus 30 is able to provide a prediction of the commercial viability of large scale extraction of hydrocarbons from the subterranean formation by performing scanning on the sample 35.

Advantageously, the predicted hydrocarbon recovery is accurate and may reduce recovery costs. In some embodiments, the method may comprise applying RF power to the subterranean formation based upon the predicted hydrocarbon recovery, and recovering hydrocarbons from the subterranean formation after applying RF power thereto (i.e. actual extraction process). The disclosed method provides an automated method for modeling shale fractures as a result of RF wave propagation techniques. Also, the method may show a qualitative two-dimensional (2D) and three-dimensional (3D) visualization of fractures.

The disclosed image processing algorithms automatically extract fracture features accurately in 3D to allow for efficient evaluation. Quantitative results are discussed using statistical attributes as well as using 2D plots for analysis. The method may quantify the increase in the fracture network due to RF heating and provide a method for change detection and analysis. By using statistical analysis, the relationship between fractures and increased oil recovery can be learned.

The disclosed approach can be used to analyze shale structure and infer increased oil extraction to increase cost effectiveness. In shale, natural fractures provide permeability and access to the oil and gas in the well, and inducing fractures helps improve oil and gas recovery in a variety of shale formations and other formations containing shale layers. Inducing fractures allows for the liquid to flow freely and therefore can be extracted easier and with less expense. Shale has low permeability, so gas production in high quantities requires fractures to provide permeability.

The apparatus 30 ingests 3D shale images using 3D scanning from samples taken before and after RF exposure. Change detection between these samples is quantified through calculating mutual information. The design of this apparatus 30 is based on the assumption that the changes that are interesting are distributed irregularly and throughout an area of interest. In short, the apparatus 30 provides an approach to the problem of modeling and visualizing shale fracture structures, and providing an approach to accurately predicting the amount of hydrocarbon resources that can be extracted.

Referring now additionally to FIGS. 3-9B, the volumetric processing Block 43 is detailed (Block 61). This discussion is carried out in the exemplary context of several test samples, in particular 4 samples. The exemplary lab setup for the process uses a CT sensor as the remote sensor to collect the volumetric data for the shale samples. The goal is to detect the shale fractures before and after RF energy is applied to the shale samples and to quantify the number, size, and vertical distance (length) of the fractures. The presence of fractures is an important for optimizing recoverable oil to be extracted in an area of interest, i.e. the aforementioned subterranean formation.

The method includes ingesting the volume slices from the sensor 34 (Block 51). For example, each volume slice may comprise an 8-bit image slice. Images 60, 65 illustrate exemplary volume slices at both pre-heating and post-heating, respectively. As can be seen in image 65, the number of fractures has increased. The method further comprises performing at least one filter process on each of the pre-heating data and post-heating data (Block 52). In the illustrated embodiment, the at least one filter process comprises a median filter process.

The method includes generating the pre-heating data by performing at least one first edge detection process, and generating the post-heating data by performing at least one second edge detection process (Block 53). In some embodiments, the at least one first and at least one second edge detection processes each comprises detecting edges of the fracturing and the additional fracturing in the sample, masking borders in the pre-heating data and post-heating data, and performing a gamma correction operation on the pre-heating data and post-heating data.

The generating of the pre-heating data further comprises performing at least one first blob filter process after the at least one first edge detection process, and the generating of the post-heating data further comprises performing at least one second blob filter process after the at least one second edge detection process (Block 54). The data is then subjected to a conversion at Block 55, where the plurality of slices is converted into a volume (Block 62).

Images 70, 75, 80, 85 illustrate the pre-heating data during different stages of the volumetric processing (Block 43). Image 70 represents the ingested volume slice, and image 75 represents the volume slice after the at least one first edge detection process. Image 80 represents the volume slice after the at least one first blob process, and image 85 represents the finished volume (assembled volume slices).

Images 90, 95, 100, 105 illustrate the post-heating data during different stages of the volumetric processing (Block 43). Image 90 represents the ingested volume slice, and image 95 represents the volume slice after the at least one second edge detection process. Image 100 represents the volume slice after the at least one second blob process, and image 105 represents the finished volume (assembled volume slices). Advantageously, the finished volume images 85, 105 clearly demonstrate the detected change in the sample 35.

Referring now additionally to FIGS. 10A-12B, several images of the volumetric fracture visualization are shown. In particular, images 110 and 115 show pre-heating and post-heating, respectively, Blob3D points with a blob threshold of 50, and a blob minimum of 50. Images 120 and 125 show pre-heating and post-heating, respectively, Blob3D points with a blob threshold of 30, and a blob minimum of 30. Lastly, images 130 and 135 show pre-heating and post-heating, respectively, Blob3D points with a blob threshold of 25, and a blob minimum of 50, which produces the most readily viewable change.

As shown in Tables 1 and 2 herein, the quantitative results of the scanning demonstrate that post-heating has 760906/61622=12.3 times more structure than pre-heating, or that the pre-heating volume has only 8.1% the amount of structure compared with post-heating volume. Each voxel in the shale sample has a length of 173.63 microns.

TABLE 1

|  | Trial 1 | Trial 2 | Trial 3 | Average | % of Structure |
|---|---|---|---|---|---|
| Pre RF (# points) | 26,440 | 68,622 | 89,894 | 61,652 | 8.1% |
| Post RF (# points) | 400,744 | 871,285 | 1,010,689 | 760,906 | 91.9% |

TABLE 2

| Per Volume | Pre RF (# points) | Post RF (# points) | % of structure |
|---|---|---|---|
| Sample 1 | 89,804 | 1,010,689 | 9%/91% |
| Sample 2 | 20,895 | 200,612 | 10%/90% |
| Sample 3 | 4,054 | 27,011 | 15%/85% |
| Sample 4 | 33,266 | 134,817 | 25%/75% |
| Mean | 37,004 | 343,282 | 11%/89% |

All of the X-ray related settings are the same for all CT scans. All settings (such as gain, X-ray energy etc.) are the same for all samples. Post-heating volumes have 37,004/313,282=8.5 times more structure on average, or pre-heating volumes have only 12% the amount of structure compared with post-heating volumes. Table 3 below shows some detailed data regarding sample 1.

TABLE 3

| Per Fracture | Pre RF (# points) | Post RF (# points) | Pre RF (Vertical Distance) | Post RF (Vertical Distance) |
|---|---|---|---|---|
| Mean | 69.3529 | 79.0057 | 2.6824 | 2.9160 |
| Standard Deviation | 17.0052 | 90.4575 | 1.5208 | 2.5940 |

Referring now additionally to FIGS. 13-15B, chart 140 shows fracture metrics at both pre-heating and post-heating for sample 1. Charts 145, 150 respectively show the changes in fracture size pre-heating and post-heating. Charts 155, 160 respectively show the changes in fracture vertical length pre-heating and post-heating.

Table 4 provides more quantitative results for samples 1-4, including both pre-heating and post-heating.

TABLE 4

| Per Fracture | Pre RF (# points) | Post RF (# points) | Pre RF (Vertical Distance) | Post RF (Vertical Distance) |
|---|---|---|---|---|
| Mean Sample #1 | 69.3529 | 79.0057 | 2.6824 | 2.9160 |
| Standard Deviation #1 | 17.0052 | 90.4575 | 1.5208 | 2.5940 |
| Mean Sample #2 | 68.5303 | 71.5864 | 2.3182 | 2.2521 |
| Standard Deviation #2 | 21.1494 | 28.9951 | 1.0548 | 1.4387 |
| Mean Sample #3 | 61.6667 | 89.5205 | 2.4167 | 3.3288 |
| Standard Deviation #3 | 10.7862 | 109.2022 | 0.9964 | 3.0462 |
| Mean Sample #4 | 67.9286 | 71.7882 | 2.2857 | 2.4824 |
| Standard Deviation #4 | 19.3971 | 29.5975 | 1.3033 | 1.6644 |

The quantitative results for fracture size and vertical length are on a per fracture basis. The size of the fracture is measured in a number of edge voxels. The vertical distance of a fracture is measured in length in voxels. For all of the sample shale data volumes, the size and vertical length increased with RF energy applied.

Table 5 shows data relating to the use of mutual information as a measure of change or similarity for samples 1-4. The mutual information value increases with increasing similarity. As the statistical relationship between the two vectors becomes more dissimilar, the joint entropy, H(X, Y), increases. The vectors X and Y correspond to histograms with twenty bins each for fracture volumetric size and fracture vertical length. The most change occurred between the pre/post RF fracturing in sample #3, since it has the lowest value for mutual information.

TABLE 5

|  | Mutual Information | Entropy Pre RF | Entropy Post RF | Joint Entropy |
|---|---|---|---|---|
| Pre/Post RF Volume 1 | 0.8597 | 3.6213 | 1.0219 | 3.7842 |
| Pre/Post RF Volume 2 | 1.7577 | 2.4464 | 2.6577 | 3.3464 |
| Pre/Post RF Volume 3 | 0.7365 | 2.0764 | 1.4190 | 2.7610 |
| Pre/Post RF Volume 4 | 1.9016 | 2.5464 | 2.4639 | 3.1087 |
| Pre/Post RF Vertical Distance 1 | 1.6171 | 2.2610 | 2.4955 | 3.1394 |
| Pre/Post RF Vertical Distance 2 | 0.9915 | 1.6568 | 2.7842 | 3.4464 |
| Pre/Post RF Vertical Distance 3 | 0.5553 | 1.2918 | 2.1855 | 2.9219 |
| Pre/Post RF Vertical Distance 4 | 0.9958 | 1.5568 | 2.5610 | 3.1219 |

Figure 16:
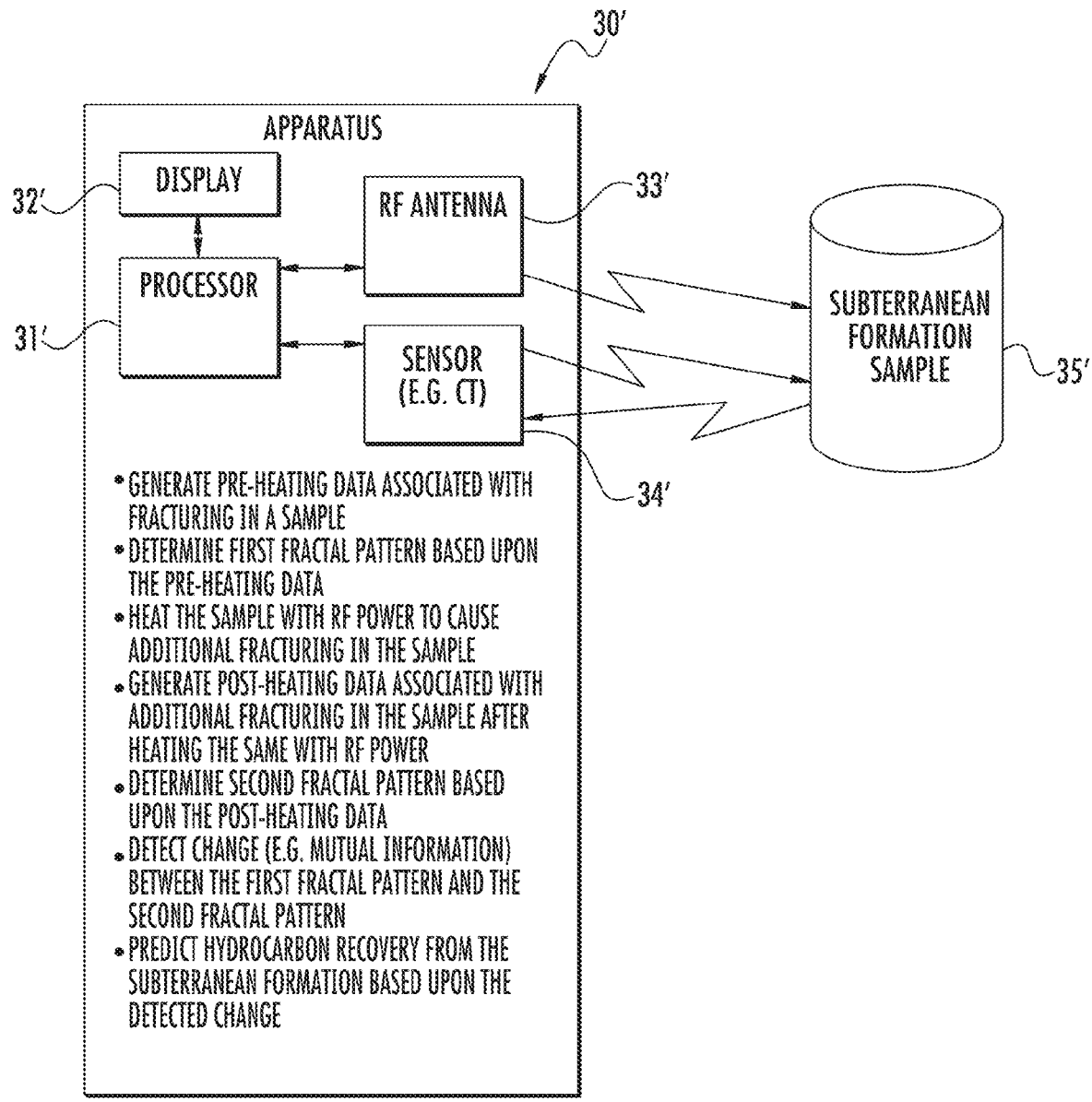
FIG. 16 is a schematic diagram of another embodiment of an apparatus, according to the present invention.

Referring now additionally to FIG. 16, another embodiment of the apparatus 30' is now described. In this embodiment of the apparatus 30', those elements already discussed above with respect to FIGS. 1-3 are given prime notation and most require no further discussion herein. This embodiment differs from the previous embodiment in that this processor 31' is configured to generate pre-heating data associated with fracturing in the sample 35' from the sensor 34', and determine at least one first fractal pattern based upon the pre-heating data. The processor 31' is also be configured to heat the sample 35' with RF power from the RF antenna 33' to cause additional fracturing in the sample, generate post-heating data, via the sensor 34', associated with additional fracturing in the sample after heating the sample with RF power, determine at least one second fractal pattern based upon the post-heating data, detect change between the at least one first fractal pattern and the at least one second fractal pattern, and predict hydrocarbon recovery from the subterranean formation based upon the detected change. In short, this embodiment of the apparatus 30' performs change detection by detecting changes in fractal patterns in the pre-heating and post-heating data.

Also, this apparatus 30' may be used with a method for predicting hydrocarbon recovery in a subterranean formation. The method comprises generating pre-heating data associated with fracturing in a sample 35' from the subterranean formation, determining at least one first fractal pattern based upon the pre-heating data, and heating the sample with RF power to cause additional fracturing in the sample. The method also includes generating post-heating data associated with additional fracturing in the sample 35' after heating the sample with RF power, determining at least one second fractal pattern based upon the post-heating data, detecting change between the at least one first fractal pattern and the at least one second fractal pattern, and predicting hydrocarbon recovery from the subterranean formation based upon the detected change. Of course, the determining of the at least one first and second fractal patterns is based upon a plurality of potential fractal patterns.

The determining of the at least one first fractal pattern is based upon at least one neighborhood of voxels in the three-dimensional mapping pre-heating data, and the determining of the at least one second fractal pattern is based upon at least one neighborhood of voxels in the three-dimensional mapping post-heating data. In some embodiments, each fractal pattern comprises an associated resolution and an associated fractal pattern type. The method also comprises displaying at least one image based upon the at least first and at least one second fractal patterns.

Figure 17:
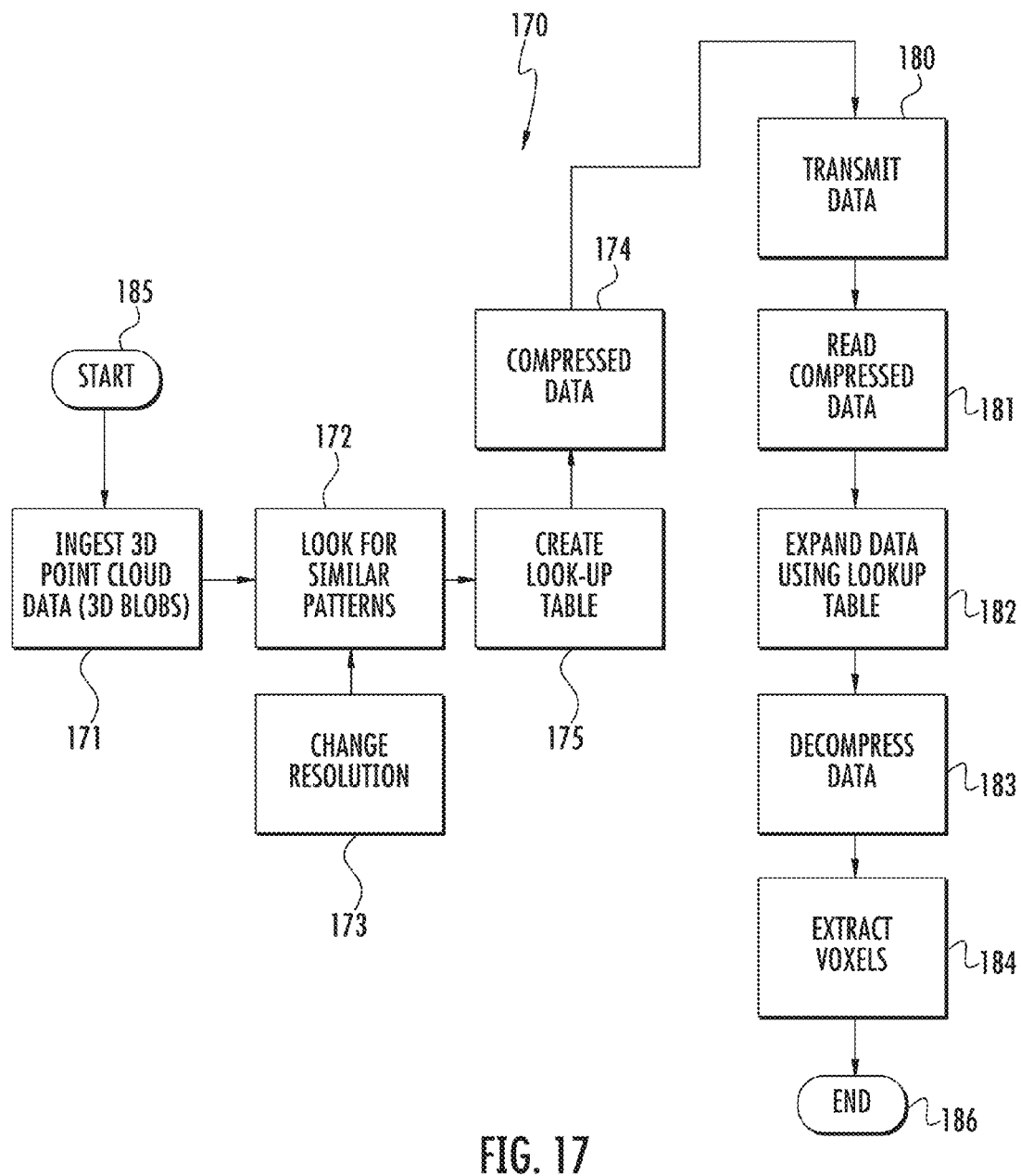
FIG. 17 is a flowchart illustrating operation of an embodiment of the apparatus, according to the present invention.
Figure 18:
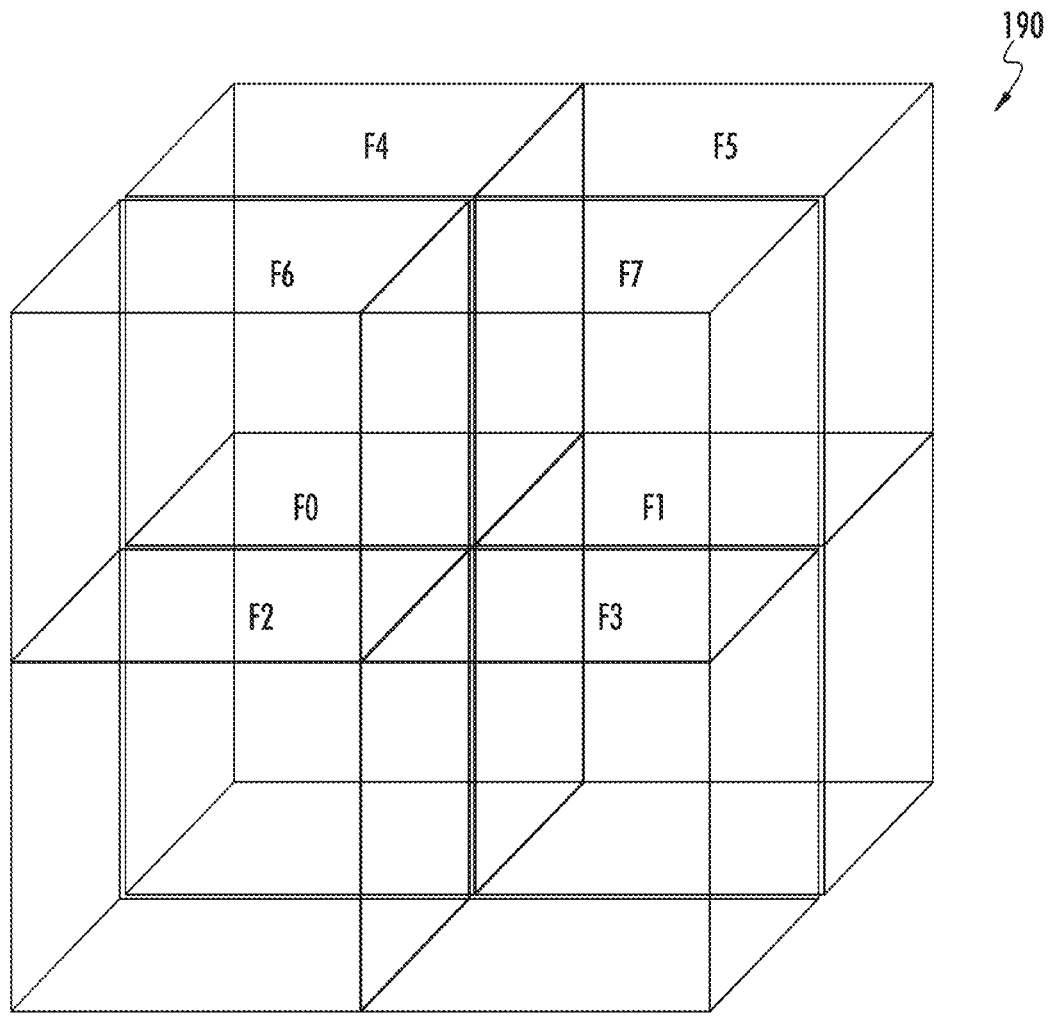
FIG. 18 is a voxel neighborhood with fractal pattern zones indicated.

Referring now additionally to FIG. 17, a flowchart 170 illustrates operation of the method of operation for the apparatus 30' (Block 185). The method includes ingesting a 3D point cloud of data from the sensor 34' (Block 171), and determining the existence of similar patterns in the input data. This determination of similar patterns is performed iteratively at multiple resolutions (Blocks 172-173). The method includes generating the fractal pattern look up table (LUT) at Block 175. The fractal pattern LUT may include a first plurality of values respectively for a first plurality of fractal patterns in the pre-heating data, and a second plurality of values respectively for a second plurality of fractal patterns in the post-heating data. The method also includes outputting the compressed data at Block 174.

Advantageously, the fractal pattern LUT replaces the 3D data ingested from the sensor 34'. Indeed, the data is compressed via this conversion to the fractal pattern LUT. Once compressed, the data may be transmitted off site, for example, in in situ applications (Block 180). Once the compressed data is received, the method includes ingesting the compressed data, and expanding the data using the fractal pattern LUT (Blocks 181-182). The method includes decompressing the data, and extracting voxels to regenerate the original 3D point cloud data (Blocks 183-184, 186).

An exemplary fractal pattern LUT is shown herein as Table 6.

TABLE 6

| X (lat) | Y (lon) | Z (height) | P1 (pattern 1) | P2 (pattern 2) | P3 (pattern 3) |
|---|---|---|---|---|---|
| 291 | 465 | 113 | 171 | | |
| 291 | 467 | 103 | 11 | | |
| 291 | 467 | 105 | 129 | | |
| 291 | 469 | 97 | 0 | 0 | 11 |
| 291 | 477 | 103 | 11 | | |
| 291 | 479 | 103 | 3 | | |
| 291 | 481 | 103 | 9 | | |
| 291 | 483 | 103 | 11 | | |
| 291 | 485 | 101 | 0 | 11 | |
| 291 | 489 | 97 | 0 | 0 | 11 |
| 291 | 497 | 101 | 0 | 11 | |
| 291 | 501 | 103 | 11 | | |
| 291 | 501 | 105 | 33 | | |
| 291 | 503 | 103 | 9 | | |
| 291 | 503 | 105 | 161 | | |
| 291 | 505 | 105 | 0 | 0 | 161 |
| 291 | 513 | 105 | 0 | 161 | |
| 291 | 517 | 105 | 33 | | |
| 291 | 519 | 105 | 161 | | |
| 291 | 521 | 105 | 0 | 161 | |
| 291 | 525 | 105 | 161 | | |
| 291 | 527 | 105 | 131 | | |
| 291 | 529 | 99 | 0 | 0 | 11 |
| 291 | 537 | 99 | 0 | 0 | 11 |
| 291 | 545 | 105 | 3 | | |
| 291 | 547 | 105 | 11 | | |
| 291 | 549 | 103 | 0 | 11 | |
| 291 | 553 | 99 | 0 | 0 | 11 |
| 291 | 561 | 105 | 9 | | |
| 291 | 561 | 107 | 33 | | |
| 291 | 563 | 103 | 0 | 11 | |
| 291 | 563 | 107 | 161 | | |
| 291 | 565 | 107 | 0 | 161 | |
| 291 | 567 | 105 | 9 | | |
| 291 | 569 | 107 | 0 | 0 | 161 |
| 291 | 577 | 107 | 0 | 0 | 161 |
| 291 | 585 | 107 | 0 | 161 | |
| 291 | 589 | 107 | 129 | | |

Referring now to FIGS. 18-21, a diagram 190 shows an exemplary neighborhood of voxels, noted F0-F7. The screenshot 200 shows a table presenting a binary representation of the existence of fractal patterns in the neighborhood of voxels, each column relating to a section of the neighborhood and each row relating to a fractal pattern type. Diagrams 205, 210 show examples of multi-resolution fractal patterns. Diagram 205 comprises a 4×4×4 space, and diagram 210 comprises an 8×8×8 space.

Referring now additionally to FIGS. 22A-25, images 215 and 220 show pre-heating and post-heating, respectively, Blob3D points with a blob threshold of 150, and a blob minimum of 150. Image 225 shows post-heating fractal patterns visualized. The points show level 2 fractal pattern locations while level 3 fractal pattern locations are shown with "X's." Charts 230, 235 show weighted fractal histograms at pre-heating and post-heating, respectively. Chart 240 includes curve 241, which shows the sensitivity analysis of the simulation.

In the following, a discussion of exemplary embodiments follows.

Introduction

Change detection is a key task in remote sensing studies where temporal data is analyzed to detect changes over a period of time. Some applications of remotely sensed change detection related to Earth sciences include environmental impact assessment, flood damage assessment and land-use and land-cover change analysis. Assessment of change is also important for military applications like surveillance of a particular area, target detection, and damage assessment. The basic principle of change detection from remote sensing images is based on the difference in reflectance or intensity values between the images taken at two different times due to changes on the Earth's surface. Some commonly used image change detection algorithms are image differencing, image ratioing, image regression, principal component analysis (PCA), and change vector analysis.

A typical requirement for change detection from remote sensing images is the accurate registration of temporal images. In other words, the images must be aligned with each other such that corresponding locations in the images are present at identical pixel positions. Any registration errors (or mis-registration) present in the images may lead to incorrect change detection.

The present disclosure discusses a robust method for quantifying change without requiring affine registration, consisting of six degrees of freedom, three translations and three rotations. The present disclosure considers mutual information in the fractal domain as the change detection method since it takes advantage of the fact that the entropy of a discrete distribution is invariant to rotation and translation.

Shale Fracture Modeling

The present disclosure demonstrates a method for shale fracturing, modeling, and change analysis. The present disclosure uses radio wave heating to penetrate oil shale to heat up water deposits to cause fractures. Modeling the size and orientation of these fractures can be used to infer financial benefits and increased oil production. The present disclosure discusses a method to assist analysts by using 3D image processing and visualization. The method of the present disclosure provides quantitative change detection metric using mutual information. Graphical 2D plots as well as 3D volumetric rendering of fractures provide qualitative change detection.

The lab setup for the disclosed process uses computed tomography (CT) as the remote sensor to collect the volumetric data for the shale samples. This lab setup is scalable for real world applications and serves as a demonstration. The present disclosure's goal is to extract the shale fractures before and after RF energy is applied to the shale samples. The present disclosure's goal is to quantify the number, size, and vertical distance of the fractures. The presence of fractures is an important for optimizing recoverable oil to be extracted in an area of interest.

The present disclosure workflow overview to extract shale fractures is shown in FIG. 2. The key components of this process are remote sensing, data conversion, volumetric processing and visualization. Quantification of the change between pre/post RF energy applied to the volumes is desired. This information in the 3D models may be used to predict the improved cost and increased oil output. The present disclosure leverages technology from geospatial remote sensing applications. Modeling of below ground fractures is very similar to modeling surface scenes from Light Detection and Ranging (LiDAR) or Interferometric Synthetic Aperture Radar (IFSAR) aerial data collections.

Volumetric processing consists of a 3D edge detector and blob filter. The blob filter finds all fractures with a given intensity threshold that are connected with a minimum size. The blob filter considers all eight neighbors in the local neighborhood around each voxel in the fracture. Extracted fractures can be exported to all the standard 3D formats for visualization. The current total processing time on SUN Blade Dual Processor is less than eight hours per 512×512×512 voxel space. However processing time with a general purpose graphics processing unit (GPGPU) is much faster. Using GPGPU processing, the current achieved fractal finding and pattern labeling operation with 100 million points is approximately 30 seconds.

The main components of the flow exploit the 3D edge and 3D blob filters. The edge detector looks in three dimensions to return edge strength for each voxel in the feature space. The blob filter finds all fractures with a given intensity threshold that are connected with a minimum size. The blob filter considers all eight neighbors in the local neighborhood around each voxel in the fracture. Extracted fractures can be exported to all the standard 3D formats for visualization. FIGS. 6A-9B show some key intermediate stages of the process.

Statistics

The present disclosure has results showing that the number of fracture points increases significantly when applying RF energy to the shale samples. Table 1 shows the number of points for the fractures that have been extracted and modeled. Post-RF has 760906/61652=12.3 times more structure or Pre-RF volume has only 8.1% the amount of structure compared with Post-RF volume. Each voxel in the shale sample has a length of 173.63 microns.

Visualizations of these volumes are shown in FIGS. 10A-12B. The figure shows three separate trials for picking intensity thresholds and minimum blob sizes to model the shale fractures from the same shale sample. The visualizations show colorization of the fractures by height using the Fugro Viewer. Another good tool for visualizing 3D points is the Quick Terrain Viewer.

Fractures have a big impact on oil production but are inherently difficult to quantify. The flow rate is dependent on the permeability of the shale. Desirable attributes are length, spacing, and connectivity. Table 2 shows quantitative results for fracture structure before and after RF energy applied. All of the X-ray related settings are the same for all CT scans. All settings (such as gain, x-ray energy etc.) are the same for all samples. The Pre-RE volumes have only about 11% the amount of structure compared with Post-RF volumes.

Figure 13:
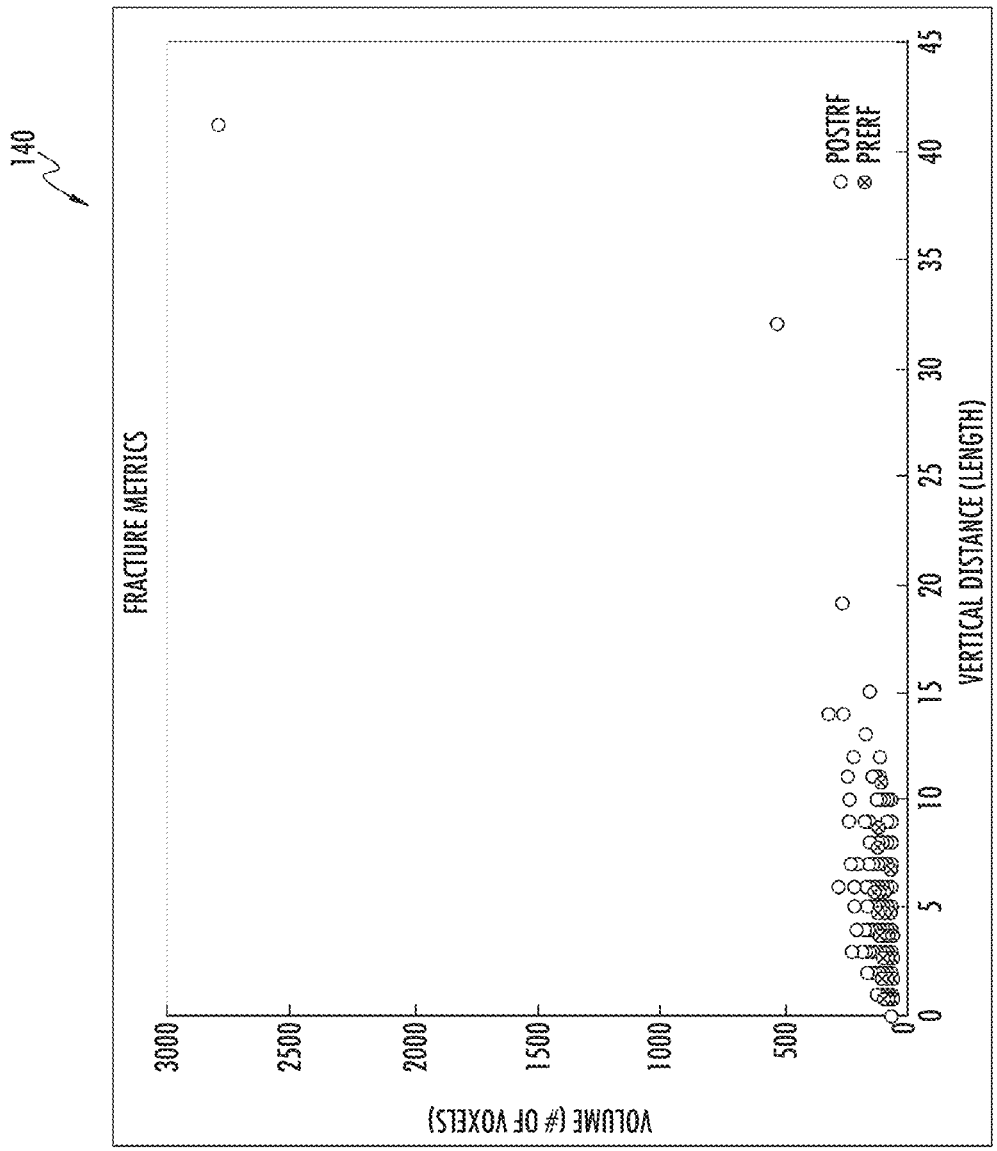
FIG. 13 is a chart of the fracture metrics from the sample, pre-heating and post-heating.
Figures 14A, 14B:
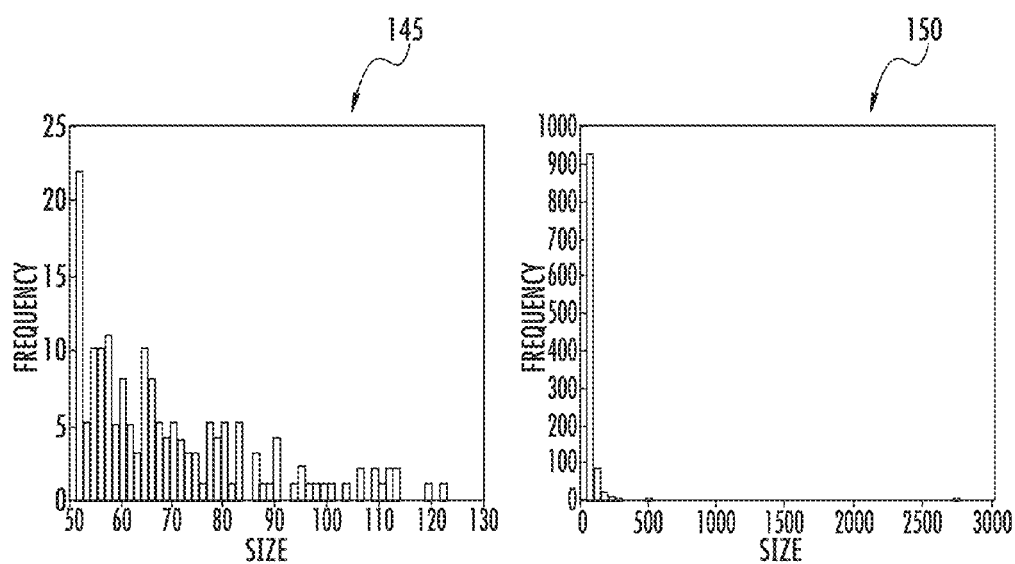
FIGS. 14A-14B are charts of fracture size from the sample, pre-heating and post-heating, respectively.
Figures 15A, 15B:
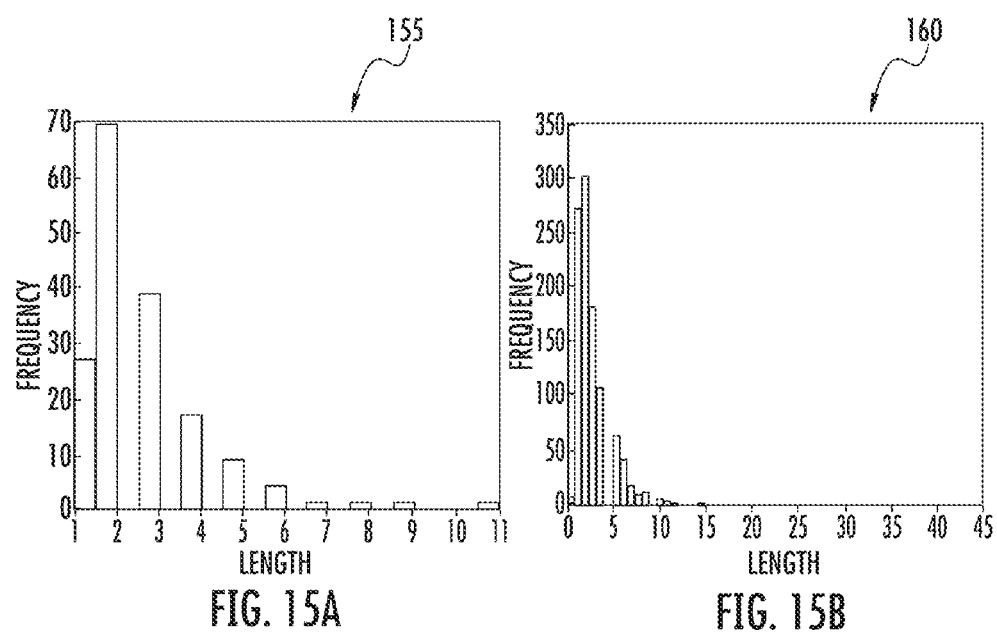
FIGS. 15A-15B are charts of vertical fracture length from the sample, pre-heating and post-heating, respectively.

FIG. 13 shows a 2D scatter plot of the fracture metrics for the volume vs. vertical distance. The plot shows that fractures of significant size and vertical dimension were created as a result of adding RF wave energy to the shale sample. The present disclosure's results show that several large fractures were created with increased vertical length. The graph shows that the metrics are positively correlated.

Table 4 shows quantitative results for several shale samples. Fracture mean and standard deviation of size and vertical length are shown on a per fracture basis. The size of a fracture is measured in number of edge voxels. The vertical distance of a fracture is measured in length in voxels. For all of the sample shale data volumes, the size and vertical length increases with RF energy applied.

Change Detection Analysis

One method for detecting change or similarity can be accomplished through the application of a mutual information algorithm. Mutual information (MI) between two variables is based on information theory. It measures the amount of information between two variables. The use of MI as a similarity measure on computed tomography data has been performed on medical images. Mutual information considers the joint entropy and the individual entropies and is defined as:

$$I(X;Y)=H(X)+H(Y)-H(X,Y); \quad (1)$$

where I is mutual information and H is entropy. When the data vectors are more similar, a lower numerical value is obtained for joint entropy. The mutual information value increases with increasing similarity. As the statistical relationship between the two vectors becomes more dissimilar, the joint entropy, H(X, Y), increases. The vectors X and Y in the experiments correspond to histograms with twenty bins each for fracture volumetric size and fracture vertical length. Entropy is defined as:

$$H(pi) = -\Sigma pi \log(pi); \quad (2)$$

where p is the probability vector for which a uniform distribution is assumed. A good implementation in Matlab is available. The present disclosure's solution for calculating mutual information makes use of fractal analysis of the extracted shale fractures. This is based on spatial information of patterns in a local neighborhood.

Table 5 shows results of calculating the mutual information and entropy for the fractal metrics of volume and vertical distance. The volume of a fracture is really the count of its edge voxels. The most change occurred between the pre/post RF fracturing in sample #3 since it has the lowest value for mutual information.

Note that a lower MI value, when comparing the pre/post RF volumes, means that the volumes are very different and quantifies the amount of fracturing performed. Recently there has been some work on calculating mutual information from 2D images by directly considering spatial information in local neighborhood regions.

Fractal Method

Three dimensional scanning systems can automatically measure a large number of points forming the surface of the earth, or some other object, and can output a point cloud as a data file. The point cloud represents the set of points in a three dimensional space that the device has measured with respect to a set of coordinate axes. The present disclosure is interested in extracting the point cloud describing the shale fracture. This is accomplished by using the points from the 3D blob filter.

The present disclosure use of fractals is based on self-similarity. The flow diagram is shown in FIG. 17. Once all of the multi-resolution patterns are found, a lookup table is generated for the 3D points. Consider a fractal pattern scheme consisting of a 2×2×2 block cube, which has up to 256 possible patterns.

From this basic element, larger patterns can be constructed. As the 2×2×2 fractal block is passed through the entire volumetric scene, similar voxel (3D pixel) patterns are identified. Here, the data are true 3D point clouds with a range or Z value.

The present disclosure's process requires considerable compute capability, such as GPGPU architecture to find the fractal patterns at multiple resolutions in near real-time. There are several formats where this method could be used besides 3D points or vertices which can be in a Common LiDAR Data Exchange (.LAS) as well as ASCII or binary format. Some popular 3D graphic polygonal formats are: Virtual Reality Modeling Language (VRML, GeoVRML), Drawing Exchange Format (DXF), Shapefiles, OpenFlight, Maya Computer Aided Design (CAD), Stereo-Lithography (STL), and Keyhole Markup Language (KML). The present disclosure's process allows for routine data conversions between the above formats listed.

GPUs are assuming a more prominent role in PC system architecture. GPUs deliver more cost-effective and energy-efficient performance for applications that need it. NVIDIA's next-generation CUDA architecture (code named Fermi), is the latest and greatest expression of this trend. With many times the performance of any conventional CPU on parallel software, and features to make it easier for software developers to realize the full potential of the hardware, Fermi-based GPUs will bring supercomputer performance to more users than ever before. GPUs have become more flexible and programmable such as NVIDIA's CUDA which is considerably faster than a CPU based algorithm. Each Fermi GPU is equipped with an L2 cache (768 KB in size for a 512-core chip). The L2 cache covers GPU local DRAM as well as system memory.

The Fermi generation CUDA architecture is the most advanced GPU computing architecture ever built. With over three billion transistors and featuring up to 512 CUDA cores, Fermi delivers supercomputing features and performance at 1/10th the cost of traditional CPU-only servers.

Figure 20:
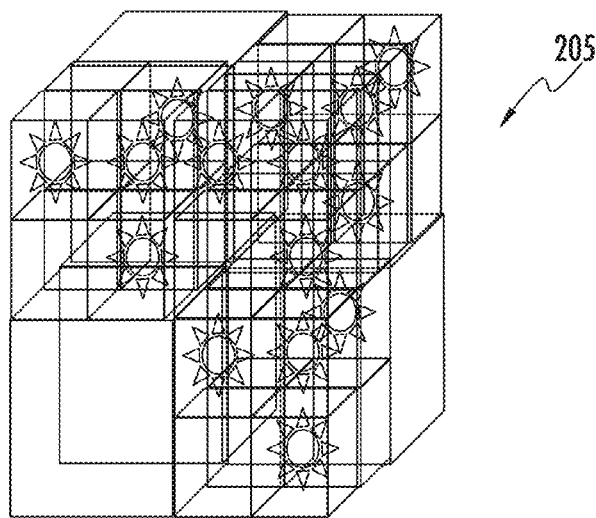
FIGS. 20-21 are schematic diagrams representing fractal patterns at 4×4×4 and 8×8×8 resolutions, respectively.
Figure 21:
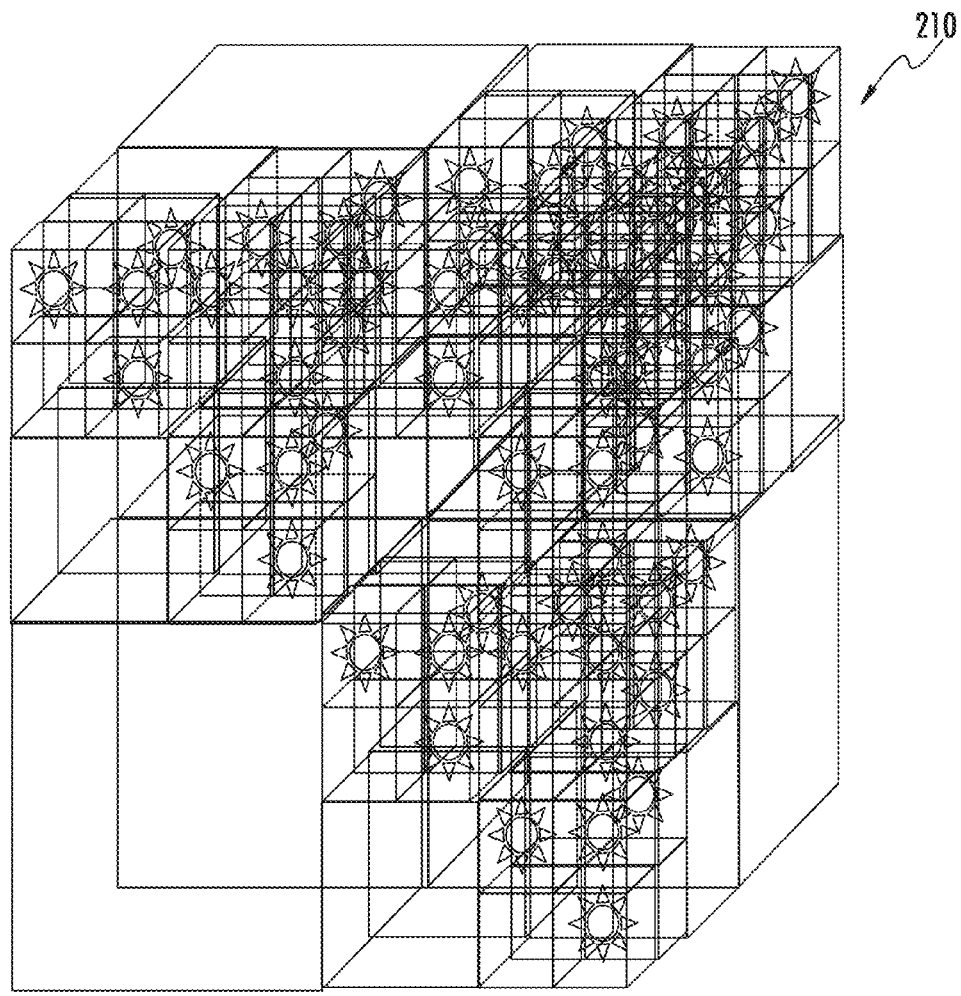

Different resolutions of data within the point cloud can be identified by building upon the 2×2×2 fractal pattern. FIGS. 20-21 show a 4×4×4 and an 8×8×8 pattern using the same pattern as the 2×2×2. This illustrates what is identified as Level 1, 2, and 3 fractal patterns. It should be noted that there is no theoretical limit to the number of levels of repeating patterns in the data, although there is diminishing returns on the number existing at higher levels.

Figure 19:
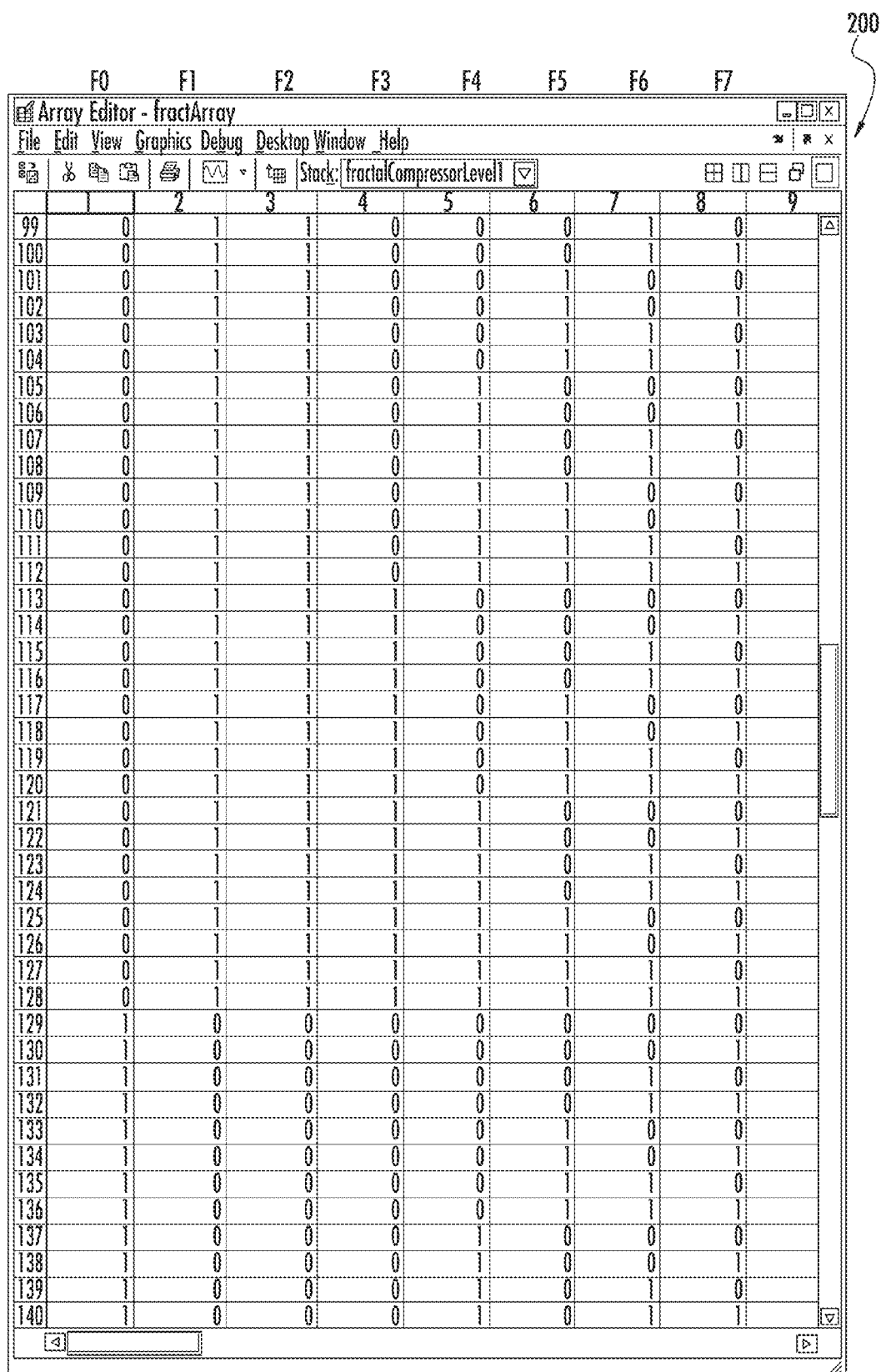
FIG. 19 is a screenshot of a table showing fractal pattern binary representation of point positions.

The use of a lookup table provides for an efficient book-keeping method for each fractal position and pattern type. By partitioning the fractal block into eight different zones, regardless of the resolution level, it is possible to efficiently track the levels of self-similarity in a code book. Since there are only 256 different patterns in a 2×2×2 block, it is relatively straightforward to use a binary set of numbers to indicate the presence or absence of a voxel point, as shown in FIG. 19. A value of one indicates the presence of a point and a value of zero indicates the non-presence of a point at the voxel location. The corresponding look-up table column and its location in the 2×2×2 cube are indicated with the label of F0 through F7.

From this binary representation, the look-up table is generated. The table contains the position of the fractal, the pattern type, and the level of repeatedness of the pattern. Note that with this information, for a level 3 fractal pattern, the amount of data represented is 8×8×8 or 512 individual LiDAR points. A part of a sample lookup table is shown in Table 6.

The first three columns contain the row, column, and height coordinates. The fourth, fifth and sixth columns show the fractal pattern for fractal levels one, two, and three. The present disclosure's system contains up to 256 possible fractal patterns. According to the lookup table, a zero placeholder is inserted in a column if there exists a higher fractal dimension for that position. For example the fourth row in the table contains a level three fractal pattern (8×8×8) of a level 3 pattern of type eleven at the x,y,z location of 291, 469, 97.

Decoding is required for locating the voxels that make up the identified fractal pattern. Efficient decoding is accomplished by expanding the fractal data patterns back to the original x, y, and z format. Each fractal in the look-up table consists of an x, y, and z position as well as the level of fractal repeated patterns found during the compression process. Since the position and pattern type is known, the pattern decoding is much faster than encoding since the information.

Results

Figures 22A, 22B:
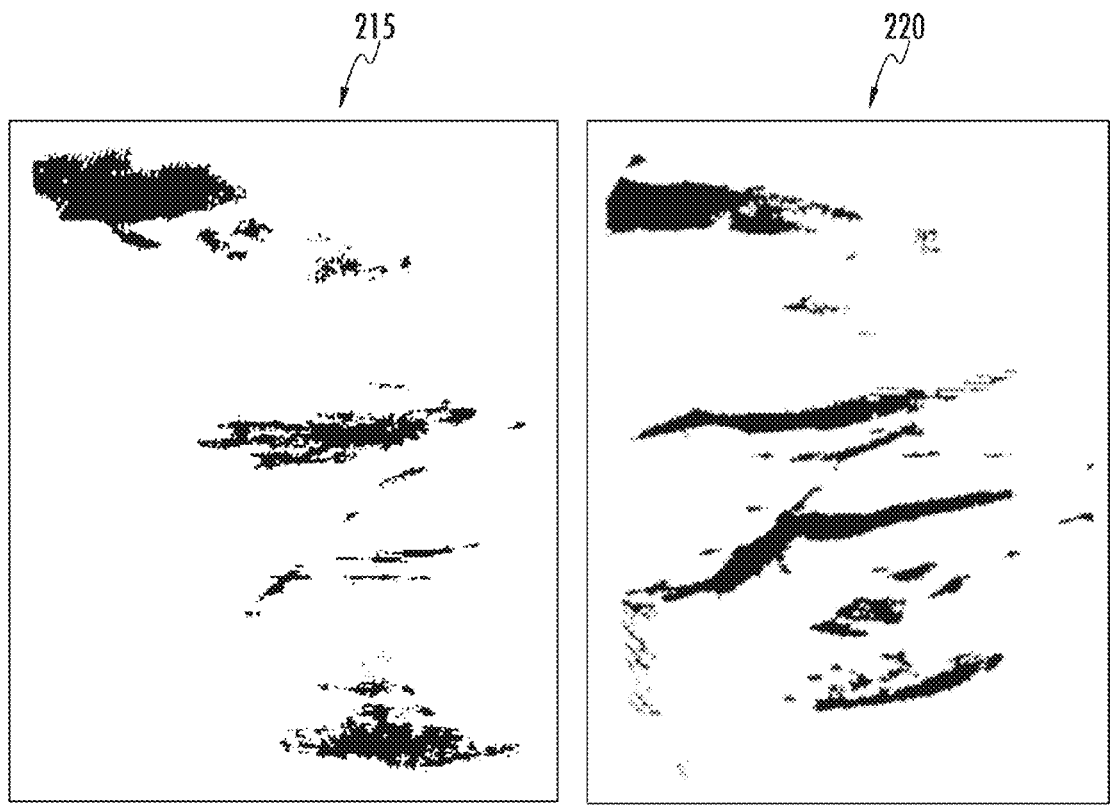
FIGS. 22A and 22B are images of a volume from a sample with Blob3D processing, pre-heating and post-heating, respectively, at a first threshold.
Figure 23:
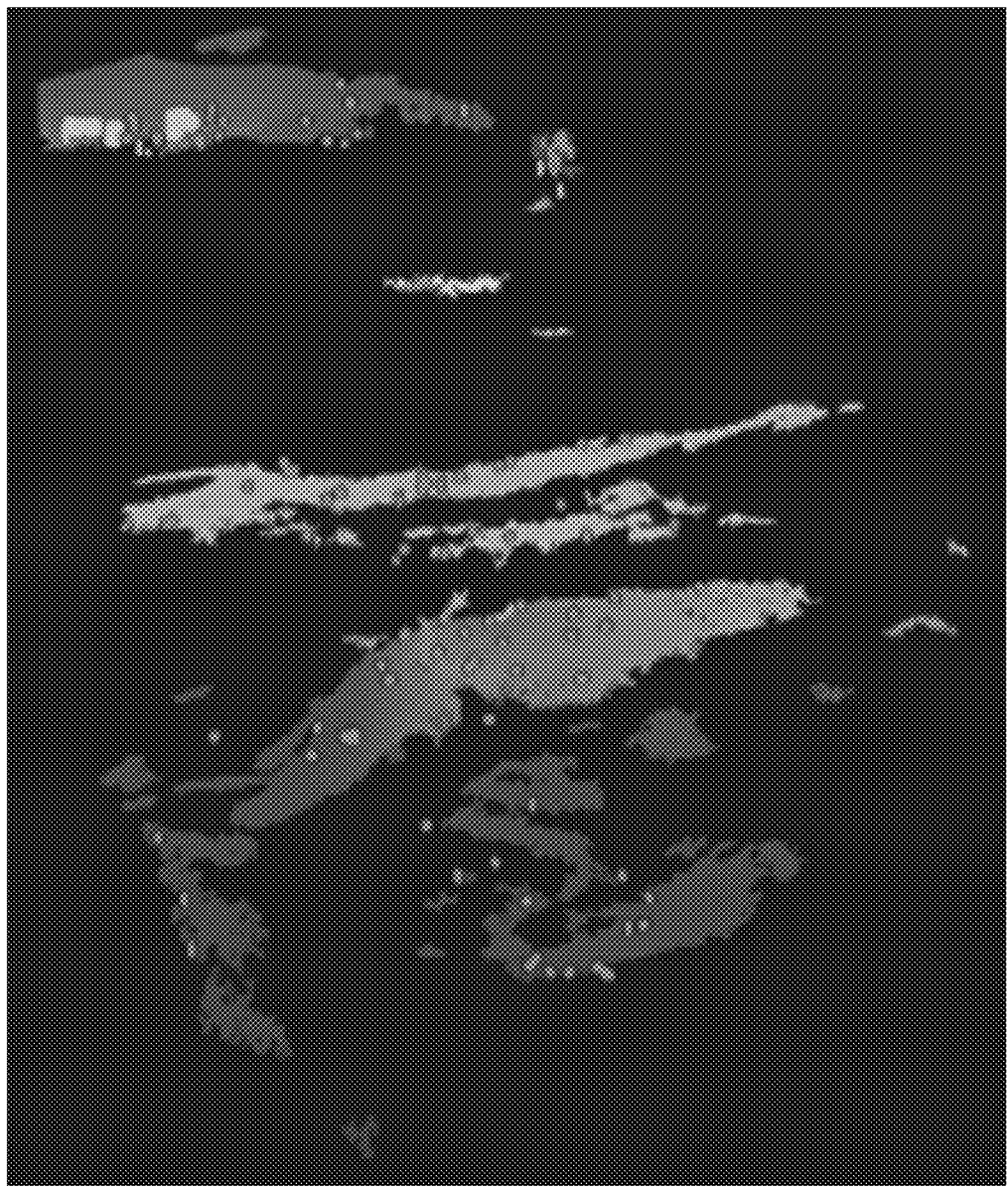
FIG. 23 is an image of a volume from the sample post-heating with fractal patterns visualized.

The results shown in FIGS. 22A-22B are visualizations of the shale fracture for pre-RF and post-RF exposure. These volumes were extracted using the 3D blob algorithm. The pre-RF volume has 229,955 points and the post-RF volume has 735,166 points. The results shown in FIG. 23 illustrate that indeed there are plenty of fractals in the data set. The fractal positions extracted are for the post RF exposure. The level 2 and level 3 fractals are shown with red and green point locations respectively. A sample test data set with calculations made using 735,166 non-duplicate points from decimeter grid contains: 185,899 Level 1 fractal counts making up 729538 points, 99 Level 2 fractal counts making up 394 points; and 25 Level 3 fractal counts making up 5234 points. The present disclosure's solution uses repeated patterns from the data itself. It should be noted that there is no theoretical limit to the number of repeating patterns in the data, but there is diminishing returns on their existence at higher levels.

Figure 24A:
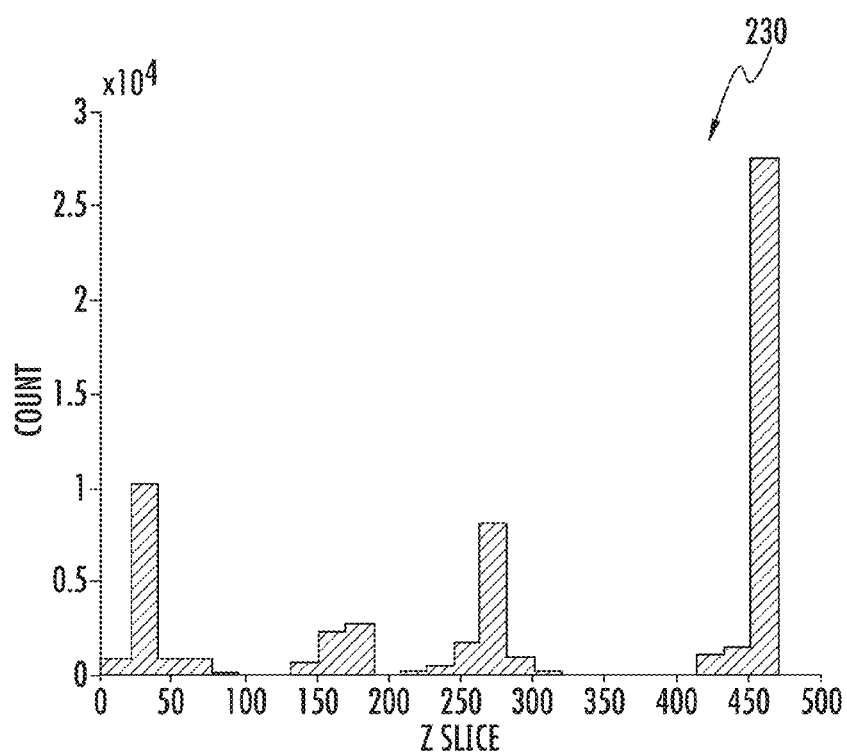
FIGS. 24A-24B are charts of fractal occurrence from the sample, pre-heating and post-heating, respectively.
Figure 24B:
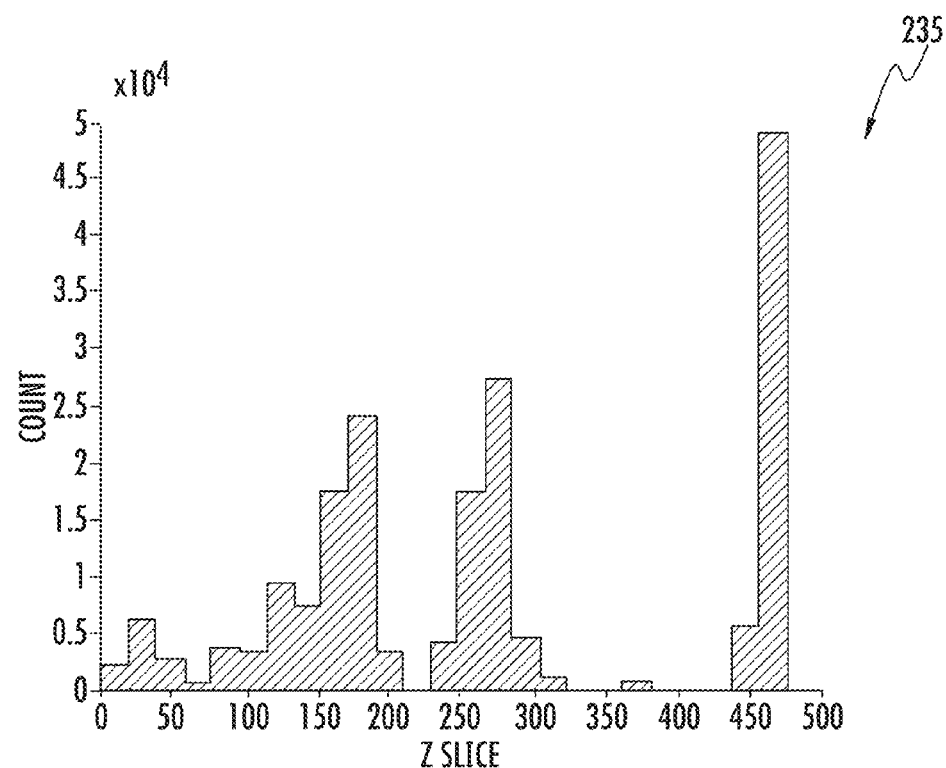

FIG. 24A shows the histogram for the weighted fractal dimension along the z axis for the pre RF exposure. Level 1 fractals are weighted by a factor of 1. Level 2 fractals are weighted by a factor of 8. Level 3 fractals are weighted by a factor of 64. FIG. 24B shows the histogram for the weighted fractal counts for the post RF exposure.

Figure 25:
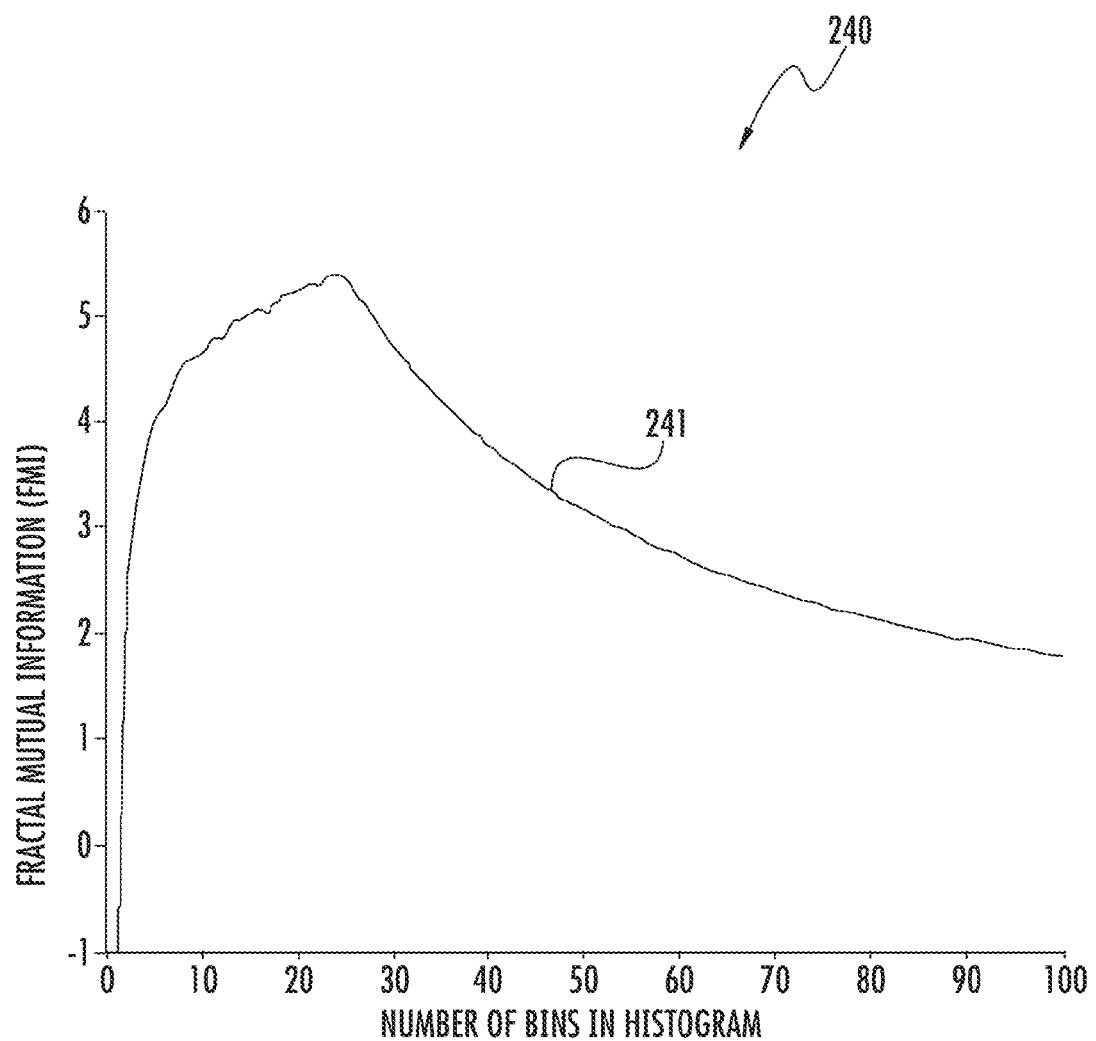
FIG. 25 is a chart of the sensitivity analysis from the sample.

FIG. 25 shows the value of fractal mutual information as a function of the number of bins in the histogram of weighted fractals along the z axis. Since entropy of a discrete distribution is invariant to rotations and translations, the value for mutual information is also invariant and thus robust to affine registration error. It is interesting to note that the maximum value of mutual information is log n of the number of data values. The selection of the number of bins was chosen based on sensitivity analysis. In this case, the number of bins used in the fractal mutual information (FMI) calculation is 25 for the X and Y vectors in Equation (1).

Fractal geometry can be useful for explaining the fracture behavior and rock properties. It was found that a peak fractal dimension value exists and corresponds to porosity. Previous studies involve correlating the fractal dimension of fractures. The information can be useful to earthquake studies. Fractal dimension describes the irregularity of the surface roughness. A higher fractal dimension corresponds to rougher fracture surface and is relevant to hydraulic fracturing of oil, gas or geothermal wells.

The fractal fracture networks in rock possess some structured features which have high cumulative production and better drainage patterns. In shale, natural fractures provide permeability and access to the oil and gas in the well. By using statistical analysis, the relationship between fractures and increased oil recovery can be learned.

CONCLUSION

The present disclosure presents a method for demonstrating and quantifying the change in shale fracturing due to the RF wave propagation. The method of the present disclosure allows a field engineer to make robust change detection calculations without the need to register the data. The data may be collected at appropriate periods to determine a cost effective stopping point since MI is correlated to cost savings. So far, processing on several different shale samples has been performed. The present disclosure's fractal method Minimizes the amount of data that needs to be considered while incorporating positional and regional neighborhood data.

The present disclosure's RF antenna and CT scanner were used as a sensor to collect volumetric data of shale samples. The use of 3D blob filter extracts the significant individual fractures of interest. The present disclosure uses mutual information to quantify change for pre/post RF shale fracturing volumes. Modeling of fracturing techniques can be used to estimate cost savings and increased recoverable barrels from potential oil reserves. The present disclosure's process increases the energy returned on energy invested (EROI) by assisting with calculating when the RF heating requirement is satisfied. Future work would be to perform calculations on increase in oil liquid flow rate due to fracturing.

Other features relating to hydrocarbon extraction are disclosed in co-pending application: titled "METHOD FOR HYDROCARBON RECOVERY WITH A FRACTAL PATTERN AND RELATED DEVICES," U.S. Publication No. US-2015-0088479, published Mar. 26, 2015, incorporated herein by reference in its entirety.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for predicting hydrocarbon recovery in a subterranean formation comprising:
generating pre-heating data associated with fracturing in a sample from the subterranean formation;
heating the sample with radio frequency (RF) power to cause additional fracturing in the sample;
generating post-heating data associated with additional fracturing in the sample after heating with RF power;
detecting change between the pre-heating data and post-heating data by calculating mutual information between the fracturing associated with the pre-heating data and the additional fracturing associated with the post-heating data; and
predicting hydrocarbon recovery from the subterranean formation based upon an amount of the detected change from the calculated mutual information between the fracturing associated with the pre-heating data and the additional fracturing associated with the post-heating data.

2. The method of claim 1 wherein detecting change comprises detecting a volumetric change in fracturing.

3. The method of claim 1 wherein the pre-heating data comprises three-dimensional mapping pre-heating data; and wherein the post-heating data comprises three-dimensional mapping post-heating data.

4. The method of claim 1 wherein generating the pre-heating data and post-heating data each comprises using computed tomography (CT) scanning.

5. The method of claim 1 further comprising performing at least one filter process on each of the pre-heating data and post-heating data.

6. The method of claim 1 wherein generating the pre-heating data comprises performing at least one first edge detection process; and wherein generating the post-heating data comprises performing at least one second edge detection process.

7. The method of claim 6 wherein generating the pre-heating data further comprises performing at least one first blob filter process after the at least one first edge detection process; and wherein generating the post-heating data further comprises performing at least one second blob filter process after the at least one second edge detection process.

8. The method of claim 1 further comprising displaying at least one image based upon the pre-heating data and the post-heating data.

9. A method for hydrocarbon recovery in a subterranean formation comprising:
generating pre-heating data associated with fracturing in a sample from the subterranean formation;

heating the sample with radio frequency (RF) power to cause additional fracturing in the sample;
generating post-heating data associated with additional fracturing in the sample after heating with RF power;
detecting change between the pre-heating data and post-heating data by calculating mutual information between the fracturing associated with the pre-heating data and the additional fracturing associated with the post-heating data;
predicting hydrocarbon recovery from the subterranean formation based upon an amount of the detected change from the calculated mutual information between the fracturing associated with the pre-heating data and the additional fracturing associated with the post-heating data;
applying RF power to the subterranean formation based upon the predicted hydrocarbon recovery; and
recovering hydrocarbons from the subterranean formation after applying RF power thereto.

10. The method of claim 9 wherein detecting change comprises detecting a volumetric change in fracturing.

11. The method of claim 9 wherein the pre-heating data comprises three-dimensional mapping pre-heating data; and wherein the post-heating data comprises three-dimensional mapping post-heating data.

12. The method of claim 9 wherein generating the pre-heating data and post-heating data comprises using computed tomography (CT) scanning.

13. The method of claim 9 further comprising displaying at least one image based upon the pre-heating data and the post-heating data.

14. An apparatus for predicting hydrocarbon recovery in a subterranean formation from a sample thereof, the apparatus comprising:
a radio frequency (RF) antenna;
a sensor; and
a processor coupled to said RF antenna and said sensor and configured to
generate pre-heating data associated with fracturing in the sample via said sensor,
heat the sample with RF power from said RF antenna to cause additional fracturing in the sample,
generate post-heating data, via said sensor, associated with additional fracturing in the sample after heating with RF power,
detect change between the pre-heating data and post-heating data by calculating mutual information between the fracturing associated with the pre-heating data and the additional fracturing associated with the post-heating data, and
predict hydrocarbon recovery from the subterranean formation based upon an amount of the detected change from the calculated mutual information between the fracturing associated with the pre-heating data and the additional fracturing associated with the post-heating data.

15. The apparatus of claim 14 wherein said processor is configured to detect change by detecting a volumetric change in fracturing.

16. The apparatus of claim 14 wherein the pre-heating data comprises three-dimensional mapping pre-heating data; and wherein the post-heating data comprises three-dimensional mapping post-heating data.

17. The apparatus of claim 14 wherein said processor is configured to generate the pre-heating data and post-heating data using computed tomography (CT) scanning.

18. The apparatus of claim 14 wherein said processor is configured to perform at least one filter process on each of the pre-heating data and post-heating data.

19. The apparatus of claim 14 wherein said processor is configured to generate the pre-heating data by performing at least one first edge detection process; and wherein said processor is configured to generate the post-heating data by performing at least one second edge detection process.

20. The apparatus of claim 19 wherein said processor is configured to generate the pre-heating data by performing at least one first blob filter process after the at least one first edge detection process; and wherein said processor is configured to generate the post-heating data by performing at least one second blob filter process after the at least one second edge detection process.

21. The apparatus of claim 14 further comprising a display coupled to said processor; and wherein said processor is configured to display at least one image based upon the pre-heating data and the post-heating data on said display.

22. A method for predicting hydrocarbon recovery in a subterranean formation comprising:
collecting a sample from the subterranean formation;
placing the sample adjacent an apparatus having a radio frequency (RF) antenna, a sensor, and a processor;
operating the sensor to generate pre-heating data associated with fracturing in the sample from the subterranean formation;
operating the RF antenna to heat the sample with RF power to cause additional fracturing in the sample;
operating the sensor to generate post-heating data associated with additional fracturing in the sample after heating with RF power;
operating the processor to detect change between the pre-heating data and post-heating data, the change being indicative of change between the fracturing and the additional fracturing; and
operating the processor to predict hydrocarbon recovery from the subterranean formation based upon the detected change.

23. The method of claim 22 wherein detecting change comprises detecting a volumetric change in fracturing.

24. The method of claim 22 wherein the pre-heating data comprises three-dimensional mapping pre-heating data; and wherein the post-heating data comprises three-dimensional mapping post-heating data.

25. The method of claim 22 wherein generating the pre-heating data and post-heating data each comprises using computed tomography (CT) scanning.

* * * * *